United States Patent
Crane et al.

(10) Patent No.: US 10,725,761 B2
(45) Date of Patent: Jul. 28, 2020

(54) PROVIDING UPDATED APPLICATION DATA FOR PREVIEWING APPLICATIONS ON A DISPLAY

(71) Applicant: Apple Inc., Cupertino, CA (US)

(72) Inventors: Neil G. Crane, San Francisco, CA (US); Joshua H. Shaffer, Woodside, CA (US); Paul W. Salzman, Palo Alto, CA (US); Michael J. Lamb, San Jose, CA (US); Austen J. Green, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/179,863

(22) Filed: Jun. 10, 2016

(65) Prior Publication Data
US 2017/0357495 A1    Dec. 14, 2017

(51) Int. Cl.
*G06F 9/44*    (2018.01)
*G06F 8/65*    (2018.01)
(Continued)

(52) U.S. Cl.
CPC .............. *G06F 8/65* (2013.01); *G06F 9/451* (2018.02); *H04L 67/04* (2013.01); *H04L 67/12* (2013.01); *H04L 67/32* (2013.01); *H04L 67/34* (2013.01)

(58) Field of Classification Search
None
See application file for complete search history.

(56) References Cited

U.S. PATENT DOCUMENTS

| | | |
|---|---|---|
| 8,933,952 B2 | 1/2015 | Zaman et al. |
| 9,060,196 B2 | 6/2015 | Torr et al. |
| | (Continued) | |

FOREIGN PATENT DOCUMENTS

| | | |
|---|---|---|
| CN | 102171940 | 8/2011 |
| EP | 2332266 | 6/2011 |
| | (Continued) | |

OTHER PUBLICATIONS

U.S. Appl. No. 15/179,877, "Non-Final Office Action," dated Sep. 15, 2017, 12 pages.
(Continued)

*Primary Examiner* — Chat C Do
*Assistant Examiner* — Lenin Paulino
(74) *Attorney, Agent, or Firm* — Kilpatrick, Townsend and Stockton LLP

(57) ABSTRACT

Embodiments provide methods and systems for updating application data in snapshots of applications for previewing. Some embodiments update application data by determining when current application data may expire and retrieving updated application data. The application data for various applications in a preview mode may be updated based on an allotted budget. Permission can be selectively granted to applications to obtain updated data so as to control the budget. Application data in the snapshots may appear updated to a user as the user browses the dock without requiring the applications to request updated application data when the user enters the dock, regardless of whether each application is active. Further, some embodiments may generate a snapshot using a layer hierarchy and image layer data generated while the application was last running if the time associated with when the application was last active is later than the time associated with an existing snapshot.

14 Claims, 12 Drawing Sheets

(51) Int. Cl.
*H04L 29/08* (2006.01)
*G06F 9/451* (2018.01)

(56) References Cited

U.S. PATENT DOCUMENTS

| | | | |
|---|---|---|---|
| 9,367,211 | B1 | 6/2016 | Turner |
| 9,916,075 | B2 | 3/2018 | Chen et al. |
| 9,918,664 | B2 | 3/2018 | Blahnik et al. |
| 9,974,467 | B2 | 5/2018 | Blahnik et al. |
| 10,520,979 | B2 | 12/2019 | Green |
| 2006/0123353 | A1 | 6/2006 | Matthews et al. |
| 2008/0005736 | A1 | 1/2008 | Apacible et al. |
| 2010/0088598 | A1 | 4/2010 | Lee et al. |
| 2011/0138295 | A1 | 6/2011 | Momchilov et al. |
| 2011/0306304 | A1 | 12/2011 | Forutanpour et al. |
| 2011/0317195 | A1 | 12/2011 | Mitsui et al. |
| 2012/0210266 | A1* | 8/2012 | Jiang .............. H04N 21/233 715/772 |
| 2012/0290657 | A1* | 11/2012 | Parks ............... H04M 1/72525 709/204 |
| 2012/0297304 | A1 | 11/2012 | Maxwell |
| 2012/0324481 | A1 | 12/2012 | Xia et al. |
| 2013/0024812 | A1 | 1/2013 | Reeves et al. |
| 2013/0190032 | A1 | 7/2013 | Li |
| 2014/0013271 | A1* | 1/2014 | Moore .............. G06F 3/0482 715/792 |
| 2014/0245461 | A1* | 8/2014 | O'Neill ............. G06F 21/60 726/28 |
| 2014/0258238 | A1* | 9/2014 | Jin .................. G06F 9/45558 707/649 |
| 2014/0280580 | A1* | 9/2014 | Langlois ........... H04L 67/148 709/204 |
| 2014/0372356 | A1 | 12/2014 | Bilal et al. |
| 2014/0378159 | A1 | 12/2014 | Dolbkian et al. |
| 2015/0324137 | A1 | 11/2015 | Wu et al. |
| 2015/0347204 | A1 | 12/2015 | Stanley-Marbell et al. |
| 2016/0092275 | A1 | 3/2016 | Booman et al. |
| 2017/0126610 | A1 | 5/2017 | Sachidanandam et al. |
| 2017/0285894 | A1* | 10/2017 | Barrus ............... G06F 3/0482 |

FOREIGN PATENT DOCUMENTS

| | | | |
|---|---|---|---|
| TW | 201232400 A | 8/2012 | |
| WO | 2010038985 | 4/2010 | |
| WO | WO-2010038985 A2 * | 4/2010 | ........ H04M 1/72583 |

OTHER PUBLICATIONS

Bertoncin, "When does Android take its recent apps switcher sceenshot," Available Online at:-https://stackoverflow.com/questions/31011593/whendoesandroidtakeitsrecentappsswitcherscreenshot, Jun. 23, 2015.
Cozma, "How recent aps work on Android 5.0 Lollipop," Available Online at:-https://www.cnet.com/how-to/how-recent-apps-work-on-android-5-0-lollipop/, Nov. 4, 2014.
PCT/US2017/034506, "International Search Report and Written Opinion," dated Aug. 24, 2017, 17 pages.
Whitwam, "Lollipop Feature Spotlight," Available Online at:-http://www.androidpolice.com/2014/10/17/lollipop-feature-spotlight-the-recent-apps-listnow-%20persists-through-reboot/, Oct. 17, 2004.
Qiu, et al., "Towards Power-Efficient Smartphones by Energy-Aware Dynamic Task Scheduling," IEEE 14th International Conference on High Performance Computing and Communications, 2012, pp. 1466-1472.
Yan, et al., "Fast App Launching for Mobile Devices Using Predictive User Context," Jun. 25-29, 2012, 14 pages.
U.S. Appl. No. 15/179,824, "Final Office Action," dated Sep. 28, 2018, 43 pages.
Budiu, "Smartwatches Are the Future-But Samsung Galaxy Gear Only Partway There," nngroup.com, Available at URL https://www.nngroup.com/articles/samsung-watch, Dec. 8, 2013.
Dobie, "Android N's Recent Apps Key Has Grown a Bunch of Awesome New X Features," androidcentral.com, Available at URL https://www.androidcentral.com/android-n-recents-menu-makes-super-easy-hop-between-apps, Mar. 9, 2016.
Hall, "Watch Complications: What is Apple Talking About?" Pocket-Lint.com, Available online at: https://www.pocket-lint.com/smartwatches/news/apple/135377-watch-complications-what-is-apple-talking-about, Sep. 22, 2015, 8 pages.
Stinson, "Google Just Made its Smartwatch Faces Actually Useful," Wired.com, Available online at: https://www.wired.com/2015/08/google-just-made-smartwatch-faces-actually-useful/, Aug. 2015, 4 pages.
Final Office Action issued in U.S. Appl. No. 15/179,877, dated Feb. 28, 2019 in15 pages.
International Preliminary Report on Patentability issued in PCT Application No. PCT/US2017/034506, dated Dec. 20, 2018 in 11 pages.
First Examination Report issued in Australia Application No. AU2017277697, dated May 20, 2019 in 2 pages.
Non-Final Office Action issued in U.S. Appl. No. 15/179,877, dated Oct. 17, 2019 in 13 pages.
Second Examination Report issued in Australia Application No. AU2017277697, dated Dec. 19, 2019 in 3 pages.
Office Action issued in Korean Application No. KR10-2018-7034647, dated Jan. 2, 2020 in 13 pages.

* cited by examiner

PROVIDING UPDATED APPLICATION DATA FOR PREVIEWING APPLICATIONS ON A DISPLAY

CROSS-REFERENCES TO RELATED APPLICATIONS

The present application is related to commonly-owned U.S. application Ser. No. 15/179,824, directed to "ENHANCED APPLICATION PREVIEW MODE," filed Jun. 10, 2016, and commonly-owned U.S. application Ser. No. 15/179,877, directed to "MEMORY MANAGEMENT FOR APPLICATION LOADING,", filed Jun. 10 2016, which are incorporated by reference it their entirety for all purposes.

BACKGROUND

The present disclosure relates generally to mobile devices, and in particular to mobile devices that can update application data. Mobile devices can display icons representing different applications where an application can be launched upon user selection of an icon corresponding to the application. Conventionally, an application icon does not convey any further information other than the application that it represents.

Further, certain mobile devices (e.g., a watch) may have limited processing power (e.g., limited random access memory (RAM), limited battery life) compared to other computing devices such as a desktop. Constantly updating application data for display every time an application makes a request is impractical as it would drain the battery life and stall other processes on the mobile device, thereby causing delays.

BRIEF SUMMARY

Certain embodiments are directed to techniques (e.g., a system, a method, a memory or non-transitory computer readable medium storing code or instructions executable by one or more processors) for managing the updating of application data for multiple applications displayed in a preview mode (also referred to as an application dock throughout the disclosure) presented on a mobile device (e.g., a wearable, a watch). The dock may display recent snapshots of certain applications. In some embodiments, the dock can include a subset of the applications on the user's mobile device that is less than the full set of applications installed on the user's mobile device. When a preview mode activated (e.g., by a user selecting a button on the mobile device or swiping in a certain direction on a display), the dock can show previews (e.g., screen snapshots) of applications that are assigned to the dock. The snapshot can show recent information (e.g., the weather, a stock price, recent news) of the application, where the information in the snapshots can be updated by a scheduling process for the applications in the application dock. In certain embodiments, the snapshots can be of an initial screen of the application. The snapshots can be browsed in the dock. When a user selects a snapshot, the application corresponding to the selected snapshot can be launched.

Certain embodiments can provide techniques (e.g., a system, a method, a memory or non-transitory computer readable medium storing code or instructions executable by one or more processors) for creating a snapshot for an application after the application has been suspended (i.e., no longer in the foreground) without having to send a request for creation of a snapshot to the application. In some embodiments, a rendering engine of a mobile device (e.g., a wearable watch) can receive and store several image layers from an application while the application is active. The image layers may be ordered based on an application layer hierarchy. After the application stops being active (e.g., ended by a user), the rendering engine can continue to store the image layers of the application along with the application layer hierarchy. Instead of having to send a request to the application for metadata so that the mobile device can present a snapshot of the application (e.g., in a preview mode), the rendering engine can create a snapshot by retrieving the stored application layer hierarchy and compositing several image layers based on the application layer hierarchy. The rendering engine may then present the snapshot of the application on an interface of the mobile device. As such, embodiments may circumvent communication with the application server to retrieve updated information about the application and present the snapshot that was last shown before the application stopped being active.

A better understanding of the nature and advantages of embodiments of the present invention may be gained with reference to the following detailed description and the accompanying drawings.

DETAILED DESCRIPTION

Figure 1:
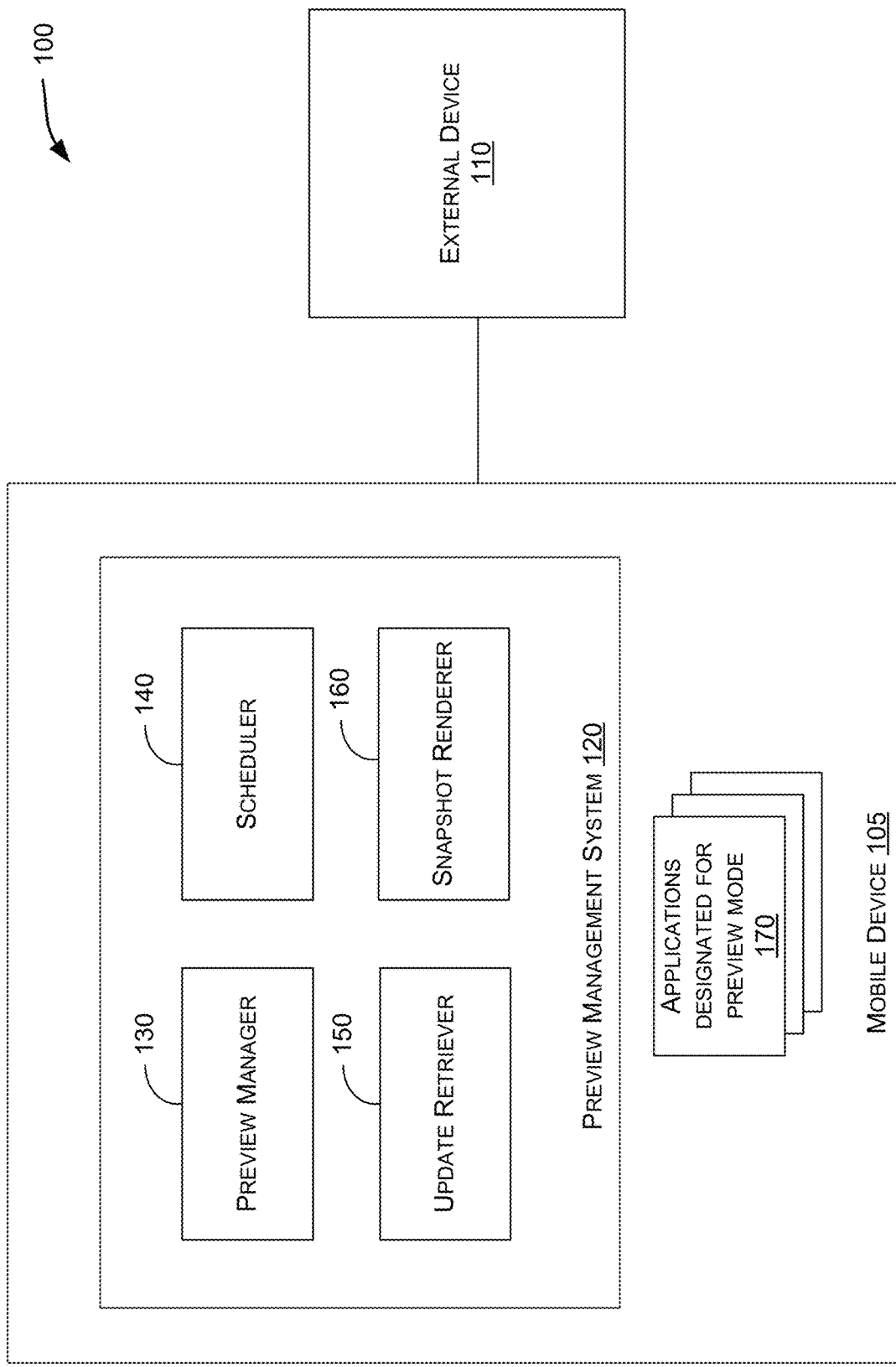
FIG. 1 depicts a simplified high level diagram of a network environment that may incorporate some embodiments.

Embodiments are directed to techniques for reducing latency in viewing application data for multiple applications in a preview mode (also referred to as an application dock, or just dock, throughout the disclosure) that is presented on a mobile device (e.g., a wearable, a watch). In some embodiments, the dock can include a subset of the applications on the user's mobile device that is less than the full set of applications installed on the user's mobile device. When the dock is requested to be viewed (e.g., by a user selecting a button on the mobile device, by a user swiping upward on a screen of the mobile device), the dock can show previews (e.g., screen snapshots) of applications that are in the dock. The snapshot can show recent information (e.g., the weather today, a current stock price, the latest news) of the application, where the information in the snapshot can be updated, since the user last interacted with the application, by a scheduling process for the application in the application dock. In certain embodiments, the snapshots can be of an initial screen of the application. The snapshots can be browsed in the dock. When a user selects a snapshot, the application can be launched.

Embodiments can allow applications to update the data in a snapshot in an energy and bandwidth efficient manner. Applications in the dock can send requests to a system scheduler to request permission to update their respective application data. The requests may be made based on a timeline for each application that indicates when the application data expires. For example, an application can indicate that it needs to update the application data in 30 minutes. The system scheduler can then determine at an appropriate time (e.g., 25 minutes later) whether to grant permission to the application to send a request to a network device (e.g., a phone that has Internet access). The permission can be based on when application data of other applications need to be updated, as well as other factors such as memory availability, RAM allocation, etc.

Upon receiving permission to request data from the system scheduler, an application may send the request for data to be obtained from an application server, which may be any device from which the updated data may be obtained. Permission to obtain data may be given for a set period of time for an application. If the time expires, a request from the application can be ignored. The permissions for the applications in the dock may be managed collectively. For example, the different applications in the dock may take turns obtaining updates in a round robin manner, e.g., as a set period of time expires for each application. As an application receives its updated application data, it may generate a snapshot of the application and present the snapshot to the operating system, which can display the snapshot to a user.

Some embodiments can provide techniques for creating a snapshot for an application after the application has stopped being active (i.e., no longer in the foreground) without having to send a request for a snapshot to the application. In some embodiments, a rendering engine of a mobile device (e.g., a wearable watch) can receive and store several image layers from an application while the application is active. The image layers may be ordered based on an application layer hierarchy.

After the application is suspended (i.e., no longer being given any processing time), the rendering engine can continue to store the image layers of the application along with the application layer hierarchy. Instead of having to send a request to the application for metadata so that the mobile device can present a snapshot of the application, the rendering engine can create a snapshot by retrieving the stored application layer hierarchy and compositing several image layers based on the application layer hierarchy. Some embodiments may create the snapshot from the previously stored application layer hierarchy if the timestamp associated with a most recent snapshot is prior to a timestamp associated with the previously stored application layer hierarchy. The rendering engine may then present the snapshot of the application on an interface of the mobile device. As such, embodiments may circumvent communication with the application server (e.g., a remote server) to retrieve updated information about the application and present a snapshot using data retrieved before the application became inactive.

I. Snapshot Preview System Overview

FIG. 1 depicts a simplified high level diagram of a network environment 100 that may incorporate some embodiments. As shown, network environment 100 includes a mobile device 105 communicatively coupled to an external device 110 (e.g., via a communication network (not shown here)). The communications between the devices may be wireless only, wired only, or a combination of the two, e.g., when intermediary devices exist between mobile device 105 and external device 110. In some embodiments, the communications between the devices may involve a Wi-Fi or a cellular modem.

Mobile device 105 can include one or more applications 170 and a preview management system 120. Preview management system 120 can include multiple components including preview manager 130, scheduler 140, update retriever 150, and snapshot renderer 160. One or more communication paths may be provided that enable the components to communicate with and exchange data with each other. The components may be implemented in software, hardware (e.g., one or more processors), or a combination thereof. In certain embodiments, the software may be stored on a non-transitory computer-readable storage medium and executed by one or more processors.

Mobile device 105 can be of various different types, including, but not limited to handheld devices such a mobile phone, a tablet, etc. or a wearable such as a watch, a tracking device, electronic glasses, etc. and other types of devices. External device 110 may be of various different types, including, but not limited to personal computers, desktops, mobile or handheld devices such as a laptop, a mobile phone, a tablet, etc., and other types of devices. In some embodiments, external device 110 may be a remote server such as an application server from which updated application data can be retrieved. In certain embodiments, external device 110 may be a mobile device (e.g., a smart phone, a tablet, a laptop) that has updated application data retrievable by mobile device 105.

A communication network can facilitate communications between one or more external device(s) 110 and mobile device 105. The communication network can be of various types and can include one or more communication networks. Examples of a communication network include, without restriction, the Internet, a wireless personal area network, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols.

A user may request to view designated applications 170 in a preview mode using mobile device 105. In some implementations, a user can designate an application for being accessible in a preview mode. Preview management system 120 can update snapshots for designated applications 170 and present the snapshots in the preview mode (also referred to as a dock throughout this disclosure). By keeping the snapshots of the applications in the dock updated, the user can navigate among the multiple applications and get a glimpse of recent or up-to-date application data before launching the application (e.g., into full screen).

In certain embodiments, the dock may be a browsable array of screenshots that can be presented to a user on a screen of the user's mobile device. In some embodiments, the dock may be activated (e.g., presented on the screen in full screen mode) upon a user selection, e.g., when the user selects a button on the side of a watch. The dock can present multiple snapshots, each displaying a preview of an individual application. The dock can provide easy access to an application by allowing the user to navigate across the various snapshots representing different applications and by launching the application from the dock upon a user selection of a particular snapshot.

A snapshot of an individual application can be updated (e.g., periodically) to include updated information associated with the application. In some embodiments, updated information is referring to application data in its present, most updated state (e.g., the current weather, the current stock price of a stock item, the current news, the current mail inbox) as if the application data is current at the instant the user is browsing the dock. For example, the preview image (also referred to as the preview of the application or the snapshot of the application) can be the same as the first screen of the application when the application is launched. But, the updates do not occur continuously, and thus the snapshots may stop being current. Whether the data is current or slightly stale, the data can still be kept recent by performing updates, which may be performed in an energy and bandwidth efficient manner. The applications being viewed in the dock have not been launched (e.g., since the last time the user interacted with the application), but may be allocated processing time to obtain updated information and create a screenshot for displaying as a snapshot in the preview mode.

In some embodiments, preview management system 120 can include preview manager 130, scheduler 140, update retriever 150, and snapshot renderer 160. In certain embodiments, preview manager 130 can identify the applications that have been selected (designated) to be part of the dock. While there may be several applications installed and running on mobile device 105, in some embodiments, designated applications 170 that have been selected to be part of the dock may be a subset of the full set of applications installed on mobile device 105 where the subset is less than the full set of applications. In various embodiments, one or more applications 170 that are part of the dock can be selected by the user, designated by a system administrator (e.g., mobile device manufacturer), selected based on user history (e.g., most frequently used by the user within a certain time period or more recently used by the user), or selected based on a combination of the previously mentioned methods. Different users would typically have different sets of applications that are part of the dock on their mobile devices. In some embodiments, there may be a total of 11 slots for applications that can be designated as part of the dock. While some of the applications designated as part of the dock may be selected by the system administrator, the user may be able to remove an application from the dock or reorder the applications in the dock. The user may also add one or more applications (currently not designated as part of the dock) installed on the mobile device into the dock.

Scheduler 140 can obtain the timeline for each application and keep track of when data for an application is likely to become invalid or outdated. The timeline information can indicate a future time when the application data may become stale. The different applications may send one or more time values to scheduler 140 to indicate that the present data (e.g., the current weather) will become outdated in 5 minutes, 30 minutes, an hour, etc. and/or how often the application may need to be updated (e.g., by retrieving updated application data from external device 110 or an application server).

Update retriever 150 can receive requests from designated applications 170 and retrieve updates for designated applications 170 from external device 110, which can be an application server. Update retriever 150 may retrieve application updates (or allow designated applications 170 to retrieve application updates) based on a timeline (e.g., a future time for when data may become too stale) received from scheduler 140. In some embodiments, update retriever 150 can receive permission from scheduler 140 to obtain application updates for an application. In certain embodiments, the permission can be granted based on an allotted budget. The budget can be based on an update frequency allotted generally for applications in the dock or for each application in the dock. As various examples, the frequency can be determined based on the number of applications in the dock, the total number of updates for all the applications allowed within a time period, and whether one application does not need to be updated in a certain time period thereby allowing another application to be able to update more frequently.

Snapshot renderer 160 can render the snapshots for applications 170 in the dock. In some embodiments, when each application obtains updated application data, snapshot renderer 160 can take a snapshot of a screen of the application that includes the updated application data. Snapshot renderer 160 may then present the snapshot of the application as the user navigates across the different snapshots presented in the dock.

The embodiment depicted in FIG. 1 is merely an example and is not intended to unduly limit the claimed embodiments of the present invention. One of ordinary skill in the art would recognize many variations, alternatives, and modifications. In one example, there may be more or fewer components in preview management system 120 than those shown in FIG. 1. In another example, one or more components shown in preview management system 120 here can be part of external device 110 instead of all being performed by mobile device 105.

II. Flow Overview of Updating Snapshots in a Dock

Figure 2:
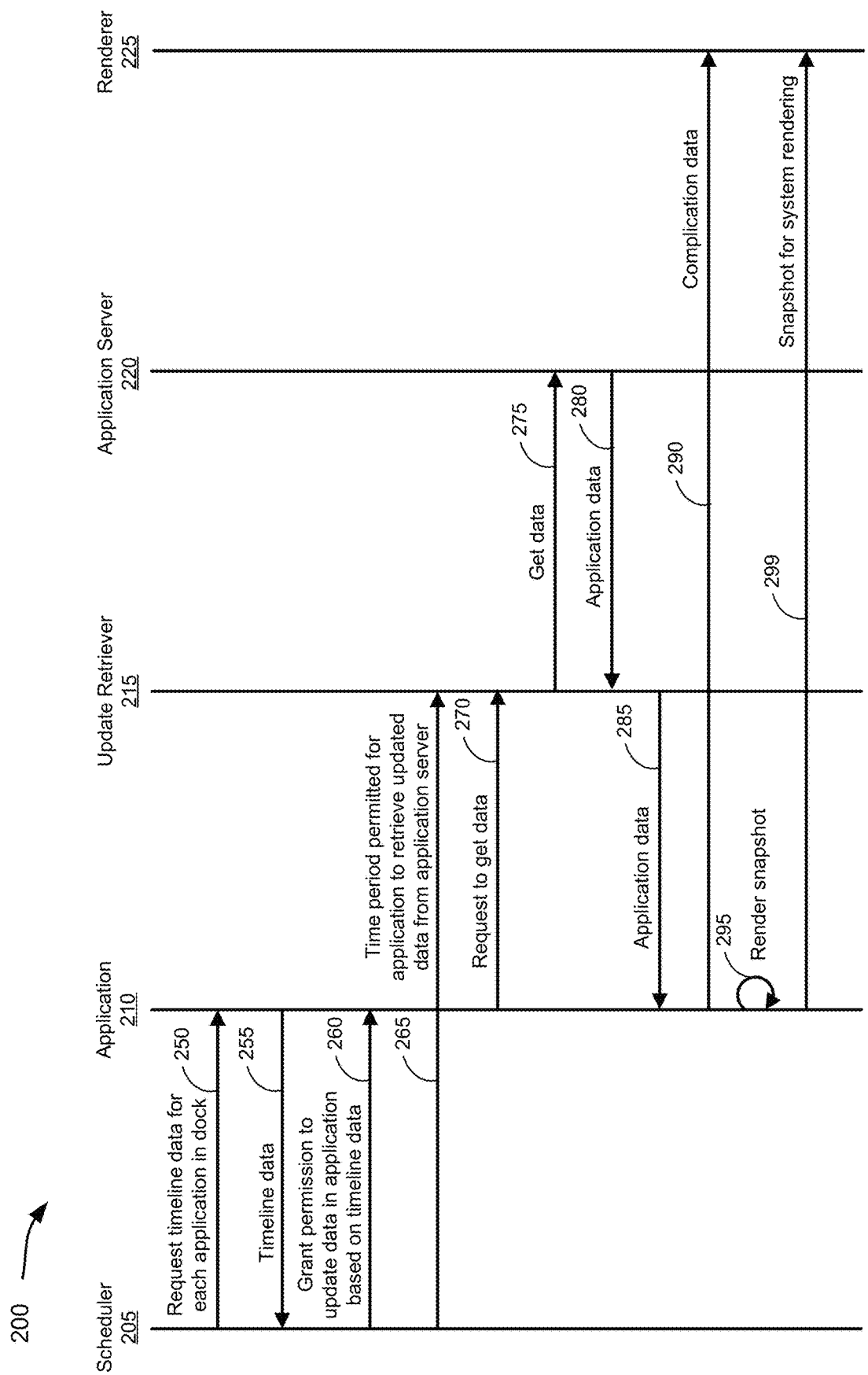
FIG. 2 illustrates an example flow for updating snapshots in a dock in accordance with certain embodiments.

FIG. 2 illustrates an example flow 200 for updating snapshots in a dock in accordance with certain embodiments. Besides allowing for display of recent data in snapshots, having the updated data can reduce latency of launching applications on a mobile device (e.g., a wearable) by periodically updating application data for a set of applications (e.g., applications in the dock). Example flow 200 illustrates an example of the flow between interacting components including scheduler 205, application 210, update retriever 215, application server 220, and renderer 225, that enable the application snapshots to appear updated.

The components may be implemented in software, hardware (e.g., one or more processors), or a combination thereof. In certain embodiments, the software may be stored on a non-transitory computer-readable storage medium and executed by one or more processors. In some embodiments, scheduler 205, application 210, update retriever 215 and renderer 225 may all be software running on a mobile device (e.g., a watch). In certain embodiments, some of these components may be partially run or fully run by an external device (e.g., a smart phone). Further, application server 220 may be run on either the external device or a remote server in some embodiments.

Keeping the application snapshots in the preview mode updated to a more recent state allows the user to be able to view updated application data prior to fully launching an application. While the user selects the application upon deciding to launch the application, the user can view the first screen of the application that has updated application data as the application is being launched. Presenting a preview of updated application data in the application icons allows the launching of an application to appear shorter and quicker to a user since the user would be viewing actual application data, as if the application has already been launched, while the application is still being launched.

At 250, scheduler 205 can send a request to an application 210 that has been designated to be part of the dock to request timeline data for the application. In certain embodiments, as there may be multiple applications in the dock, scheduler 205 can send the request to each of the several applications in the dock. Scheduler 205 may obtain timeline data in order to schedule a next time(s) in which the application data will need to be updated again, for instance, when the data will become stale or invalid. In some embodiments, the request may be sent after the application has been updated (e.g., either by the application running or upon receiving an update for a preview to be generated). In certain embodiments, the requests can be sent periodically (e.g., every day, every hour). In some embodiments, scheduler 205 may not need to send a request for timeline data to receive timeline data from the individual applications.

At 255, application 210 can send scheduler 205 timeline data. In certain embodiments, timeline data can indicate when current application data will expire or become invalid. As described, in some instances, application 210 can send timeline data without receiving a request from scheduler 205. In some embodiments, timeline data can include a future time in which the current data that mobile device has will expire. In certain embodiments, timeline data can indicate multiple different times in which different portions of the application data will expire or become invalid. The application may send multiple times in which different application data of the application may become outdated. Each application may send scheduler 205 one or more times upon receiving a request from scheduler 205 or along with application data when the application data is being updated.

At 260, scheduler 205 can grant permission to update data in application 210 based on the timeline data. In some embodiments, scheduler 205 grants permission in response to a request for permission to update data from application 210. The timeline data may indicate that the application data will need to be updated (because of data becoming stale or outdated) at one or more future times. In certain embodiments, the permission can be granted based on budget in addition to the timeline data indicating when data will expire. The budget may limit a total number of times an application gets updated within a set time period. For instance, the budget may indicate that each application may be updated at most once in an hour. In another instance, the budget may indicate that there can be a particular number of updates permitted each time period (e.g., hour) and depending on the total number of applications in the dock, each application may be allotted an update allowance of more than once in the time period.

At 265, scheduler 205 can send an indication to update retriever 215 as to the time period permitted for the application data to be updated. In some embodiments, the permission can be granted for a limited time period, where the application 210 or update retriever 215 can retrieve updated application data from an application server 220 (that can be an external device such as external device 110 from FIG. 1) within the time period. The time period may specify a time interval starting from a particular future time to another future time, or may be a set time interval such as 2 minutes, 5 minutes, etc. In certain embodiments, any requests for application data received beyond the allotted time period may be ignored or dismissed.

At 270, application 210 can send a request to update retriever 215 to get data. The request can cause update retriever 215 to obtain updated application data. The updated application data can include the data that would appear on a first screen of the application when an application is launched. Further, in some embodiments, the data retrieved can also include complication data that can be used to update a complication on the face of the mobile device (e.g., on the default display page of the mobile device). In certain embodiments, a "complication" is an item on the face of a mobile device (e.g., a watch) that does not tell time, such as date, weather, atmospheric pressure, calendar information, etc. A particular complication can correspond to a particular application running on the mobile device.

At 275, update retriever 215 may request data from application server 220 in response to receiving the request to get data at 270. In some embodiments, application 210 may be the component requesting data from application server 220 while update retriever 215 enforces the limitations on the data retrieval (e.g., time period, amount of data requested, bandwidth or processing power of the mobile device allotted, etc.). Application server 220 may be an external device such as external device 110 from FIG. 1. For example, application server 220 may be another mobile device (e.g., a smart phone) that is communicatively coupled to the mobile device (e.g., a smart watch). In another example, application server 220 may be a remote server that services the particular application 210. Mobile device may obtain updated application data directly from the remote server (e.g., through cellular capabilities, WiFi capabilities on the mobile device) without requiring another intermediate device (e.g., the smart phone). In some embodiments, an intermediate device (e.g., the smart phone) can be between the mobile device and application server 220.

At 280, application server 220 can send the requested application data back to update retriever 215. In some embodiments, application server 220 may send the requested application data directly back to application 210.

At 285, update retriever 215 may send the application data received from application server 220 to application 210.

At 290, application 210 can process the received updated application data and send complication data to renderer 225. In certain embodiments, complication data may be updated at the same time based on the received updated application data. In some embodiments, the complication data and the snapshot are designed to be reasonably in sync. When complications update their data by requesting for new application data, the system may schedule an immediate update for the snapshot in some embodiments.

At 295, application 210 can create the snapshot based on the received updated application data. In some embodiments, the snapshot is created based on a first screen that the application would present if the application is launched (e.g., where the application would display at least some of the updated application data). In certain embodiments, the type of information to be displayed by a snapshot can be customized by a user. As part of creating snapshot, application 210 can determine the data to be presented in the snapshot using the received updated application data and allow a renderer (e.g., renderer 225) to generate a snapshot of the data to be presented.

At 299, application 210 can send the snapshot to renderer 225 for generating the snapshot for display by the operating system. Generating the snapshot for display can involve various levels of processing. In some embodiments, renderer 225 can receive application data and then render the snapshot for display on the mobile device. In certain embodiments, renderer 225 can receive a screenshot from application 210 and perform formatting or other limited processing to display the snapshot. The interaction between different components described above can be performed in any suitable order unless otherwise indicated herein or otherwise clearly contradicted by context.

III. Generating Updated Snapshots

Certain embodiments enable one or more applications in a dock to update its snapshot so that a user may view updated application data as the user browses the applications accessible via the dock. In some embodiments, an update retriever (e.g., similar to update retriever 150 in FIG. 1 and update retriever 215 in FIG. 2) can determine when to allow applications in the dock to obtain updated application data. In certain embodiments, the update retriever may determine to allow applications to obtain updated application data based on a number of factors, including the number of total applications in the dock, the number of updates requested by the individual applications, the budget that is allotted to each application in obtaining updates, etc. In certain embodiments, the functionalities of the update retriever can be performed by one or more processors of a mobile device (e.g., a wearable device) or a combination of mobile devices (e.g., a mobile phone and a wearable device).

A. Use of Timeline Data for Updating Data for Snapshots

Figure 3:
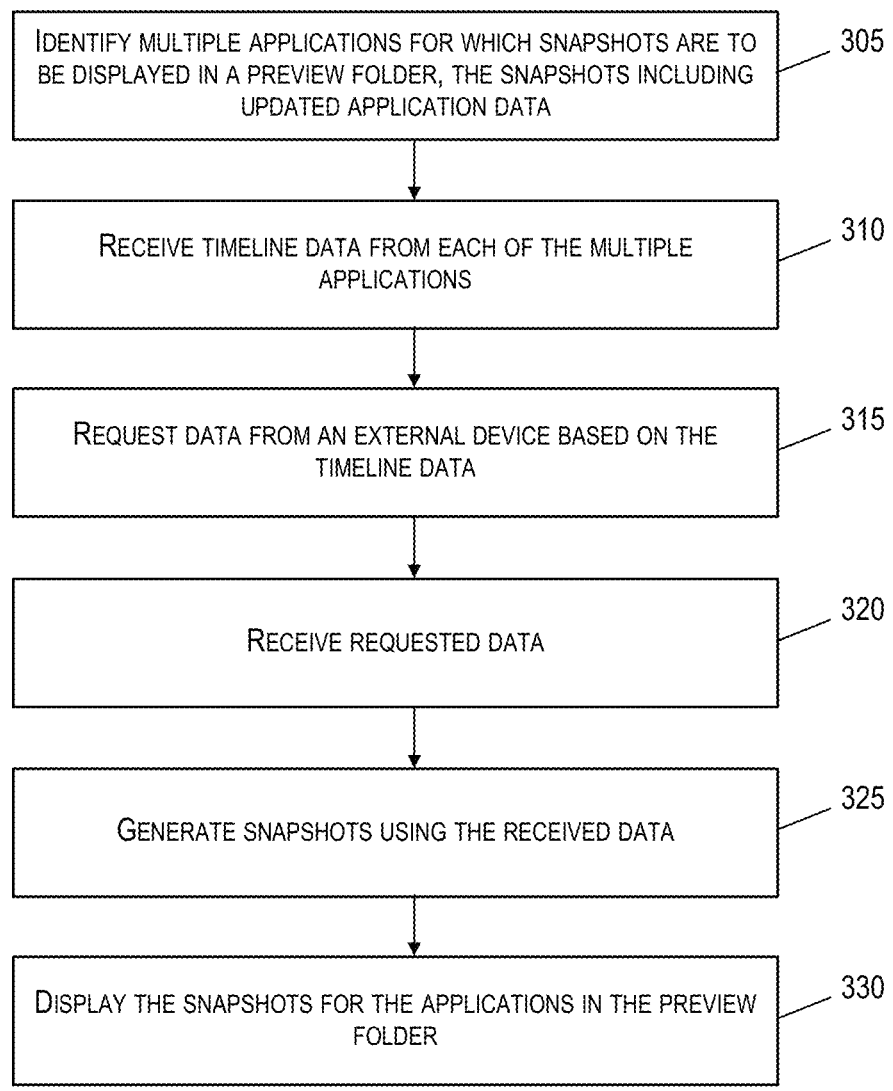
FIG. 3 illustrates an example process for generating and displaying one or more snapshots for one or more applications in a dock according to certain embodiments.

FIG. 3 illustrates an example process 300 for generating and displaying one or more snapshots for one or more applications in a dock according to certain embodiments. Process 300 may be performed by software (e.g., instructions or code modules) when executed by a central processing unit (CPU or one or more processors) of a logic machine, such as a computer system or information processing device, by hardware components of an electronic device or application-specific integrated circuits, or by combinations of software and hardware elements.

At block 305, process 300 can identify multiple applications for which snapshots are to be displayed in a preview mode. In certain embodiments, the snapshots can include updated application data such as a recent stock price, recent weather, recent news, etc. In some embodiments, a snapshot of an application can be its home page (also referred to as home screen) of the application. For instance, a snapshot of a news application can include all its headline news that are up-to-date at the time the snapshot is taken. In another instance, a snapshot of a weather application can include the current weather of a default location (e.g., a current location of the user) and predicted weather for the following hours beyond a current time.

Different embodiments may determine which applications to be part of and thus accessible from the preview mode differently. In some embodiments, the applications that are part of the preview mode can be pre-designated by a system administrator. Certain embodiments allow a user to select the applications to be part of the dock (e.g., through system preferences, an application menu). Some embodiments can determine one or more applications to be part of the preview mode by tracking user history and identifying those applications that are most recently used (e.g., last 10 applications launched by the user), used most frequently within a certain period of time (e.g., last month, past week, last year), used at the highest frequency (e.g., user uses the application more than a threshold number of times each day, each week, or in the past year), or used the longest (e.g., user usually spends about 10 minutes on the application a day as opposed to other applications where the user only spends a minute or two on each day in totality), etc.

At block 310, process 300 can receive timeline data from each of one or more applications. Timeline data can indicate when the data that is currently on the local mobile device (e.g., smart watch) will expire or become outdated. Timeline data can indicate a future time for which updating is desired by an application. In certain embodiments, timeline data may further indicate a suggested time to request the data for the update that is prior to the time in which the current data will expire. An update retriever may then retrieve the updated data based on the suggested time or based on the time in which the data will expire.

At block 315, process 300 can request data from an external device based on the timeline data. In some embodiments, updated application data can reside on another mobile device (e.g., a laptop, a mobile phone, a tablet). In certain embodiments, updated application data can be retrieved from a remote server that services the application. Each application may indicate the type of data that it needs in order for the snapshot to have updated application data.

In some embodiments, application data may be retrieved based on an allotted budget. In some embodiments, to prevent applications from requesting updated data whenever they request it, the system can control which applications can request updated data and at which times by granting permission. In certain embodiments, the system controls the budget and grants the application the right to update. Some embodiments may allot a total budget of the mobile device's available energy and data to updating application snapshots for all the applications in the dock. Depending on the number of applications designated to be in the dock, the total budget may be divided across those applications. Certain embodiments may allot a certain amount of processing power and bandwidth to updating application data for applications in the dock on an hourly basis. Some embodiments may permit each application in the dock to update its data once every time interval (e.g., an hour, 6 hours, a day). In some embodiments, if a user interacted with an application in the dock or if the application has received a notification (via push notification from the server), then the application may be allowed to schedule an update or update its application data without encroaching on the budget allotted for updating application data for applications in the dock.

At block 320, process 300 can receive requested data. In some embodiments, the requested data can be received from another mobile device (e.g., a user's mobile phone that is currently connected to the mobile device) or from a remote server. In certain embodiments, the mobile device may receive further timeline data from the other device in addition to the requested data where the further timeline data may indicate another future time in which the requested data will become expired. In some embodiments, process 300 may then request for permission to update a snapshot based on this further timeline data, where the process described in process 300 can be performed again in updating application data.

At block 325, process 300 can generate snapshots for display using the received data. The generation of a snapshot can include sending the received application data to each application for the application to create a screenshot reflecting the updated application data, and the screenshot can be used to generate the snapshot for display in the preview mode. In some embodiments, the snapshot may be of a first screen that the application would present when launched. In certain embodiments, the snapshot may be customized to present data that the user would like to view when an application is launched, e.g., the user may have customized a news application to present local news based on the user's current address whenever the user activates the application.

At block 330, process 300 can display the snapshots for the applications in the preview mode. In some embodiments, the snapshots of the applications can be displayed when the user activates an application dock and enters a preview mode, e.g., by selecting a button on the user's mobile device, upon a toggle selection, upon selection of a user interface element. The user may browse the preview mode and navigate among the snapshots representing each application. Upon selecting a particular snapshot, the application may be launched and enter into a full screen mode. In some embodiments, the activation of the preview mode can be used as criteria for determining when to update a snapshot of an application.

B. Managing Permission to Obtain Updated Data for Snapshots

Figure 4:
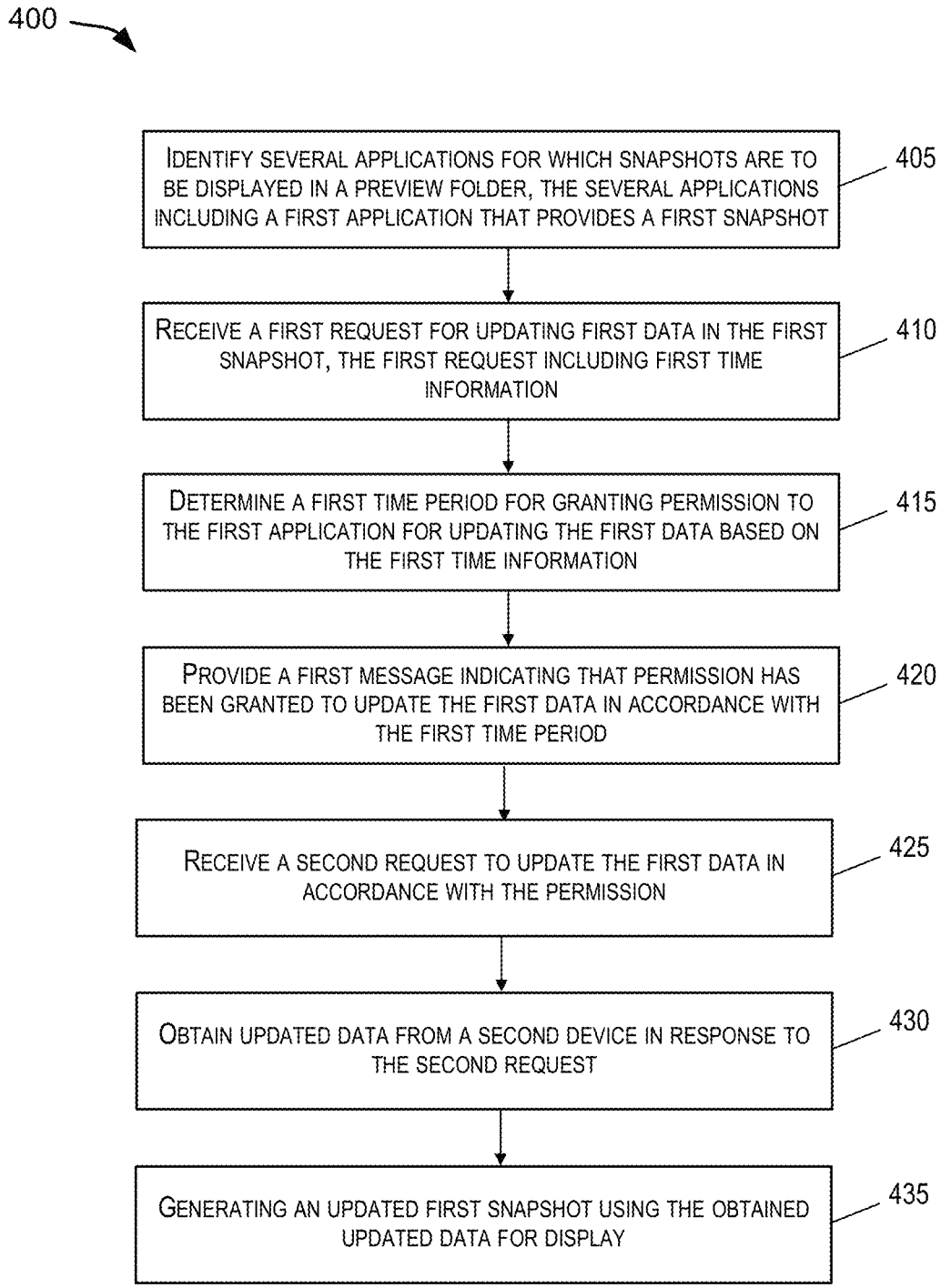
FIG. 4 illustrates another example process for keeping snapshots of applications in the preview mode updated in accordance with some embodiments.

FIG. 4 illustrates another example process 400 for keeping snapshots of applications in the preview mode updated in accordance with some embodiments. Process 400 can be performed by a preview manager (e.g., preview manager 130 from FIG. 1), a scheduler (e.g., scheduler 140 from FIG. 1), an update retriever (e.g., update retriever 150 from FIG. 1), a snapshot renderer (e.g., snapshot renderer 160 from FIG. 1), or a combination thereof. These components implementing process 400 may reside on a mobile device and may be executed by one or more processors of the mobile device.

At block 405, process 400 can identify applications for which snapshots are to be displayed in the preview mode. The identified applications can include a first application that provides a first snapshot and a second application that provides a second snapshot. Each snapshot may present application data that is frequently being updated (i.e., real-time information). In some embodiments, prior to identifying the applications that are part of the preview mode, the applications to be part of the preview mode can be determined (e.g., based on user's historical interaction with the applications). The applications that are accessible via the preview mode are fewer than the total number of applications installed on and accessible on the mobile device.

At block 410, process 400 can receive a first request for updating first data in the first screenshot. The first request can be received by a scheduler and from the first application. The first request can include first time information. In some embodiments, first time information can indicate a time in which the current application data residing on the mobile device's memory becomes outdated. The first time information can be a timestamp in some embodiments. In certain embodiments, multiple requests can be received from different applications that are part of the dock where the different requests include timeline information indicating when the application data for the corresponding application will expire or become outdated. For instance, another request can be received from another application for updating the data in another snapshot. The other request may include timeline information as to when the application data in the other snapshot becomes outdated and will require an application update.

At block 415, process 400 can determine a first time period for granting permission to the first application for updating the first data based on the first time information. The determination can be made by the scheduler in some embodiments. In various embodiments, the determination can be made in response to receiving a request from an application to update application data or in response to receiving timeline data from one or more applications. The first time period can be determined based on the first time information.

In some embodiments, the first time period may also be determined based on budget allotted to updating the application. As an example, it may determine to allow the application to update for 20 second, 2 minutes, or 10 minutes. The update retriever may then send a request for application data (or allow the application to retrieve application data) 10 minutes prior to the first time information (e.g., when the data expires). In some embodiments, if a request for application data is made outside of the first time period, the request may be ignored.

At block 420, process 400 can provide a first message indicating the permission to update the first data in accordance with the first time period. The first message can be provided by a scheduler to the first application. In certain embodiments, the first message may also indicate the first time period in which the updated application data may be requested. If the request for updated data is within the first time period, then permission to update the first data may be granted. Certain embodiments may dismiss or ignore the request for updated data if the request is beyond the allotted time period. Furthermore, some embodiments may not provide a message to the first application indicating the permission and proceed to request for updated application data with an application server.

At block 425, process 400 can receive a second request to update the first data in accordance with the permission. In some embodiments, the second request can be received by an update retriever such as update retriever 150 from FIG. 1 and from the first application. In certain embodiments, the second request is received at a data service daemon. Some embodiments may provide to the data service daemon a second message indicating the permission for the first application to request updated data for the first time period.

At block 430, process 400 can obtain updated data from a second device in response to the second request. Upon receiving the second request, some embodiments may send a request to an application server (e.g., a mobile phone or a remote server via the mobile phone) for updated application data. In some embodiments, the updated application data may be application data necessary to create a snapshot of the application (e.g., a first page of the application or a customized page of the application).

At block 435, process 400 can generate an updated first snapshot using the obtained updated data for display. In some embodiments, the application may generate the updated snapshot upon receiving the updated data. Some embodiments may provide the updated data to the first application to generate the updated first snapshot for display. In certain embodiments, the application may assemble the data and enable a preview manager (e.g., preview manager 130 in FIG. 1) to generate a snapshot of the assembled data.

Some embodiments may receive the updated first snapshot from the first application and display the updated first snapshot in the preview mode. In some embodiments, the preview manager may provide the generated snapshot to snapshot renderer (e.g., snapshot renderer 160 in FIG. 1) to render the snapshot. Snapshot renderer 160 may cause the snapshots for multiple applications in the dock to be displayed. The user can browse the dock and navigate among the snapshots displaying data in each application in the dock to find the application that the user would like to launch. Upon detecting that a snapshot has been selected by a user, embodiments may then launch the application that corresponds to the selected snapshot.

Some embodiments may receive requests from other applications in the applications that are part of the dock to update their application data. The time period for which each application may be granted permission to update data may be different. In some embodiments, the applications may be allotted different time periods to update. The applications may update their application data in a round robin manner where the requests to get data for different applications are scheduled one after another. The applications may take turns obtaining updated application data. Requests to update data received outside of when the time period is allotted for each application may be ignored.

In some embodiments, during the time period allotted for an application, the application can obtain data from an application server to get more current data. In certain embodiments, if the application determines that there have been no changes to the data that it currently has, the application can indicate to the system (e.g., preview manager) that the data is still valid and any previously existing snapshot has not expired. If the application determines that there are changes, then it can indicate to the system that the snapshot needs to be refreshed and that the previously existing snapshot has expired.

Accordingly, a snapshot of an application can be updated with updated application data regardless of whether the application is actively running (e.g., even while the application is not actively running). When the application is not actively running, it is not in launch mode where all the application data needed to run the application has been loaded. But, the snapshot can still provide recent information, thereby reducing the need to launch the application. Displaying application snapshots with recent (e.g., updated) application data would make it appear to a user as if the application was running. Further, by displaying an initial page of the application with updated application data as if the application were launched and running would improve the user experience as the user selects to launch the application because it would appear as if the application is launching quicker than it is in reality (i.e., if the application were being loaded into memory and then launched).

IV. Application Requesting Updated Data and Providing a Snapshot

As described above, embodiments can provide updated snapshots of applications in a dock without having to launch the applications. Certain embodiments can manage the application data update requests from applications and facilitate data retrieval in order for the application to generate an updated snapshot.

Figure 5:
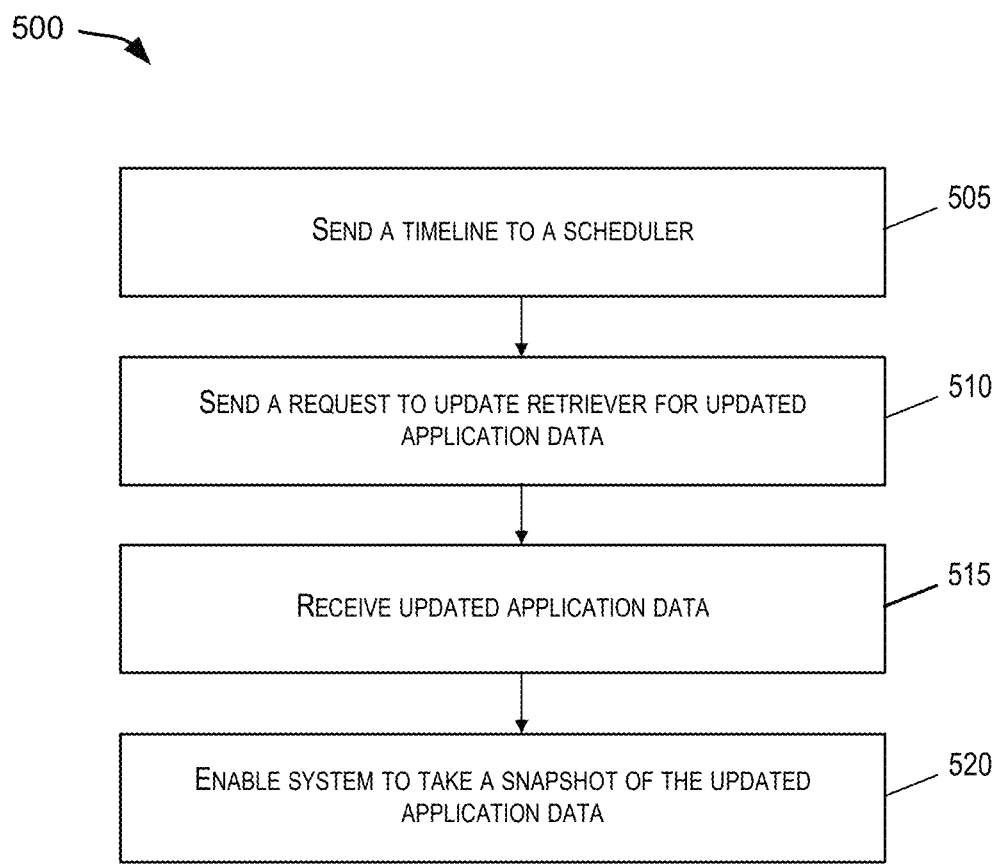
FIG. 5 illustrates an example process for obtaining updated application data and enabling a system to take a snapshot of the updated application data in accordance with some embodiments.

FIG. 5 illustrates an example process 500 of an application for obtaining updated application data and enabling a system to take a snapshot of the updated application data in accordance with some embodiments. In some embodiments, each application that is accessible from the preview mode can perform process 500 in generating a snapshot for display. Process 500 can be performed by an application (e.g., one of applications 170 from FIG. 1) on a mobile device (e.g., mobile device 105 from FIG. 1) and may be executable by one or more processors of the mobile device.

At block 505, process 500 can send a timeline to the scheduler (e.g., scheduler 140 of FIG. 1). Each application in the dock can indicate when the present application data would need to be updated for the data to stay current (or relatively current). An application can send to scheduler a timeline such as one or more timestamps indicating when updated application data would be desirable.

At block 510, process 500 can send a request to an update retriever (e.g., update retriever 150 from FIG. 1) for updated application data. The application may request the update retriever to send a request to an application server for application data. In some embodiments, if the request from the application is not within a time period determined by the update retriever to be the time period in which permission has been granted for data retrieval, then the request may be denied or ignored. The time period determined to be appropriate for data requests can be determined based on budget, time(s) when the application data becomes outdated, amount of data, time, and/or processing power needed for each update, etc.

The application can receive permission from an update retriever to update data, where the permission is given based on a timeline of the application and budget constraints. The budget constraints may indicate a number of times that the application may request for updates within a set time period (e.g., an hour), or the amount of data the application may obtain, etc. In certain embodiments, after the application sends a request to the update retriever, the update retriever may grant the application permission to retrieve data. The application may then retrieve the data from an application server in some embodiments. In some embodiments, the update retriever may retrieve the data for the application. As described, the duration of the retrieval period may be limited based on the budget allotted for each application. The update retriever may obtain the data based on a timestamp indicating when the current data will become outdated (e.g., minutes before the time specified by the timestamp or at the time specified by the timestamp).

At block 515, process 500 can receive updated application data. In some embodiments, an update retriever may obtain application data and send the application data to the application. In certain embodiments, the application may receive updated application data from the application server and process the received data for a snapshot to be taken.

At block 520, process 500 can enable the mobile device (e.g., a preview manager part of the operating system) to take a snapshot of the updated application data. Upon receiving updated application data, the application can assembled the data and allow the preview manager to take a snapshot of the assembled data.

V. Example Screenshots

Figure 6A:
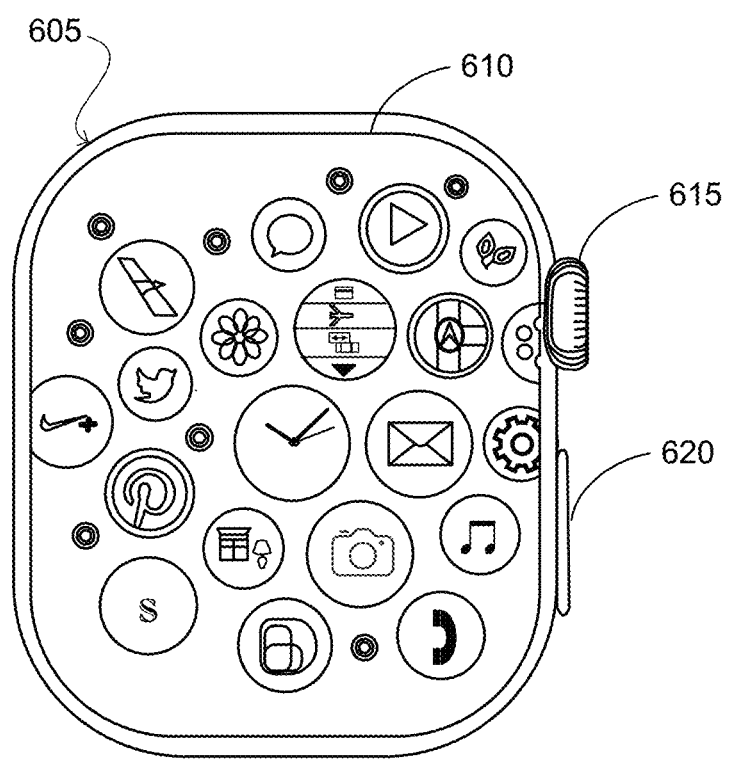
FIGS. 6A-6C illustrate an example sequence of screenshots for presentation of updated snapshots of applications that are selectable by a user to launch an application in accordance with certain embodiments.
Figure 6B:
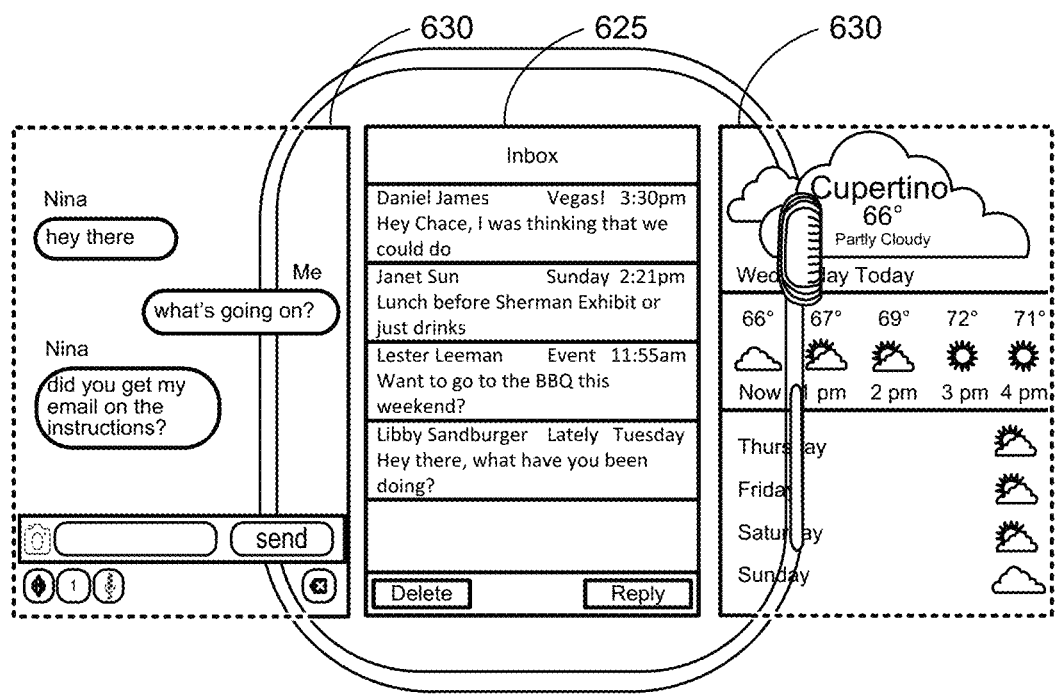
Figure 6C:

FIGS. 6A-6C illustrate an example sequence of screenshots for presentation of updated snapshots of applications that are selectable by a user to launch an application in accordance with certain embodiments. In FIG. 6A, a wearable device 605 is shown. Wearable device 605 can include a touchscreen-enabled graphical user interface 610 displaying several icons on its home screen. Wearable device 605 can also include a digital crown 615 and one or more selectable buttons 620 on the device. A user may launch or activate an application by selecting (e.g., tapping) an application icon on graphical user interface 610, by zooming in on an icon using digital crown 615, by manipulating button 620, or by other selection means.

In some embodiments, the user may activate a dock mode upon selecting a button such as button 620. In dock mode, graphical user interface 610 may display one or more application icons that each represent an application. In some embodiments, the application icons can display a preview of updated application data. The application data of applications in the dock may be updated on a periodic basis or updated as needed to keep the data as updated and recent as possible.

FIG. 6B shows an example of application icons being displayed while the dock mode is activated. In dock mode, graphical user interface 610 may display one or more application icons 625 and portions of additional icons 630 to signal to the user that there are more application icons neighboring the full application icon(s) 625 being displayed, and that the user may navigate to those icons (e.g., by swiping the screen with a finger, by tilting the mobile device, by turning digital crown 615).

In FIG. 6B, there is a single full application icon 625 displayed in the center of graphical user interface 610 and portions of application icons 630 displayed adjacent to icon 625. When a user browses the dock and navigates to those neighboring icons, the user may then view the portions of the application icons that are currently dotted out. The portions of the icons that are dotted out indicate that the user may not see those portions while the interface 610 is centered on application icon 625. Different embodiments may accommodate different numbers and portions of applications on a screen differently.

Embodiments may present updated snapshots of applications in the dock. The icons in the dock are updated according to processes described in this disclosure. These processes enable the user to view updated application data while navigating across icons in the dock where the icons show previews of those applications.

FIG. 6C shows a full screen mode of a mailbox application. After the user browses the previews of different applications in the dock, the user may select a particular icon that represents an application and thereby cause the application to be launched. Once the application is launched, the application is in full screen mode. In some embodiments, the preview of the application (e.g., preview in application icon 625) and the application launched in full screen mode display the same view of the application, as shown here in this figure, since the preview already included updated application data.

VI. System Overview of Generating an Application Snapshot Using Layer Hierarchy Some embodiments may display one or more snapshots for one or more applications when a user enters the dock. A snapshot may be generated based on updated application data (e.g., recently updated application, real-time data). In some embodiments, regardless of whether the application is running, the application data in the snapshot may be updated based on a timeline as described earlier. Some embodiments may display a most recent snapshot that was displayed in the dock. In certain embodiments, the snapshot may be recreated using a layer hierarchy that was previously generated while the application was running.

In some embodiments, when a user launches an application and the application is actively running, a layer hierarchy can be created. The application can have image layer data and can be displaying the layer data based on the layer hierarchy. When the user exits the application (or in some instances, the application is no longer running in the foreground and is only running in the background), the layer hierarchy is kept in memory by e.g., a renderer of the mobile device. In some embodiments, the application keeps the layer hierarchy instead of deleting it from memory. In certain embodiments, the memory can be a local data storage that is persistent such that the layer hierarchy continues to be accessible after the application is exited.

Some embodiments may determine to display a snapshot when a user has entered the dock (i.e., activated the dock to be viewed such that the dock is now in full screen mode). Certain embodiments may determine how to generate the snapshot for display based on a timestamp of the previously stored layer hierarchy and layer data. Some embodiments may determine a timestamp of when an application is exiting and store the layer hierarchy (e.g., in a local data storage of the mobile device where the local data storage is a persistent storage), image layer data, and the timestamp in persistent memory storage. In certain embodiments, the image layer data may be layers of application data. Some embodiments may layer the different layers of application data to create a snapshot of the application. The layer hierarchy may specify a configuration of how the image layers are overlaid on top of each other for a current snapshot. In some embodiments, different image layers can include different application data. For example, an image layer for a weather application can include a current temperature whereas another image layer can include a predicted temperature at a later hour, an image of a current weather state (e.g., rain, sunny, cloudy, etc.), or a sunset time, etc.

Some embodiments may generate a snapshot for an application by retrieving a previously stored layer hierarchy and assembling layer data based on the layer hierarchy. Certain embodiments may determine to display either the most recent snapshot that was displayed in the dock or a new snapshot generated using the previously stored layer hierarchy. In some embodiments, the determination may be made based on a comparison between the timestamp associated with the most recent snapshot and the timestamp associated with the previously stored layer hierarchy. In some embodiments, the timestamp associated with the previously stored layer hierarchy may include a time that the application is exited. In certain embodiments, the timestamp may include a time that the previously stored layer hierarchy was last generated. In some embodiments, the layer hierarchy may be generated prior to application being closed. In certain embodiments, the layer hierarchy may be generated upon receiving an application update.

Figure 7:
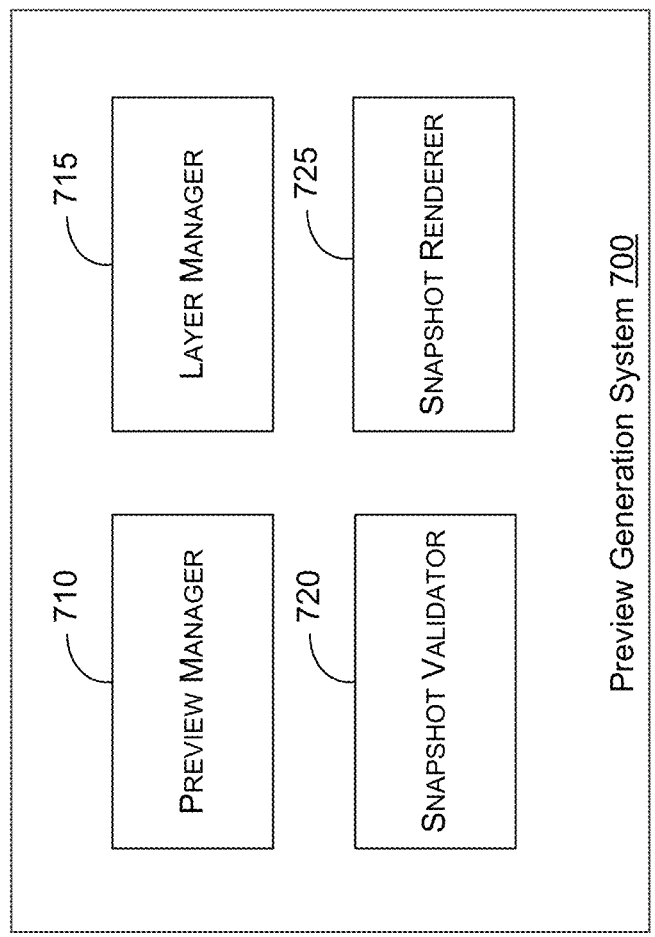
FIG. 7 illustrates a simplified block diagram of a preview generation system according to some embodiments.

FIG. 7 illustrates a simplified block diagram of a preview generation system 700 according to some embodiments. In some embodiments, system 700 can include multiple subsystems including a preview manager 710, a layer manager 715, a snapshot validator 720, and a snapshot renderer 725. One or more communication paths may be provided that enable the subsystems to communicate with and exchange data with each other. The subsystems may be implemented in software, hardware, or a combination thereof. In certain embodiments, the software may be stored on a non-transitory computer-readable storage medium and executed by one or more processors.

In some embodiments, preview manager 710 may determine which snapshot to use for display in a preview mode when a user enters dock mode. Upon determining that the user has activated the dock to view the application snapshots, preview manager 710 can determine whether to use a current application snapshot or to create a new snapshot for an application in the dock. Embodiments may determine to use an existing snapshot or to create a new snapshot depending on how outdated the application data in the existing snapshot is. The new snapshot may be created using a layer hierarchy and layer data of an application.

Layer manager 715 can store image layer data and a layer hierarchy for each application in the dock when an application is run and then exited. Further, layer manager 715 can determine a time that an application is exited and store the time along with the layer hierarchy and image layer data for the application. In some embodiments, the layer hierarchy and the layer data may be stored when the application is running. In certain embodiments, the timestamp of when the application is no longer running (i.e., exited, no longer running in the foreground) can be stored along with the layer hierarchy and the layer data of when the application was last running and retrieving data from an application server.

In some embodiments, snapshot validator 720 can determine which source of application data has the most up-to-date information. In certain embodiments, snapshot validator 720 can compare timestamp data of a currently existing snapshot and timestamp data of a layer hierarchy and layer data. In some embodiments, snapshot validator 720 may determine that the existing snapshot includes more updated information if the timestamp indicates that it is more recently created (or that the application data is more recently updated) compared to when the layer hierarchy was last created and stored. On the other hand, snapshot validator 720 may determine that the existing snapshot includes less updated data compared to the data stored in the image layer data if the timestamp of the layer hierarchy indicates that the application was more recently run and that the layer data may include more updated application data compared to the application data in the existing snapshot. In certain embodiments, preview manager 710 may then determine to use a newly created snapshot instead of the existing snapshot for display in the preview mode.

Snapshot renderer 725 can render the snapshots for display in the preview mode. After preview manager 710 determines whether to use the old, existing snapshot that is currently being used in the preview mode or to use a new snapshot that is created using a layer hierarchy and layer data of an application, snapshot renderer 725 may then render the snapshot for display on the mobile device accordingly. As described, the determination can be made based on a timestamp associated with the existing snapshot and a timestamp associated with the layer hierarchy and/or the layer data of the application. Snapshot renderer 725 can render multiple snapshots for the multiple applications in the dock as preview manager 710 makes the individual determination for each application in the dock.

VII. Process of Preparing a Snapshot Using Layer Hierarchy

Figure 8:
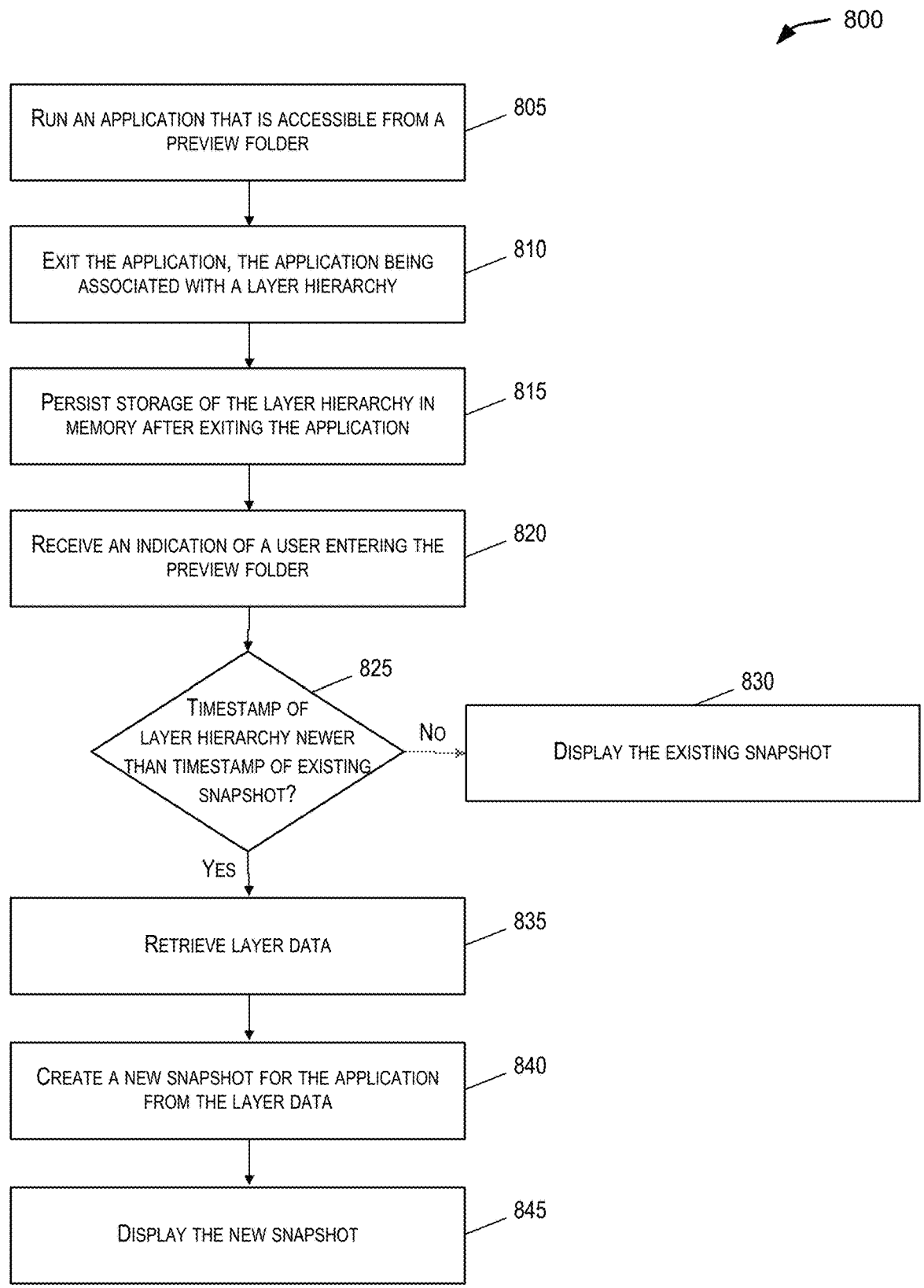
FIG. 8 illustrates an example process for displaying an application snapshot according to some embodiments.

FIG. 8 illustrates an example process 800 for displaying an application snapshot according to some embodiments. When a user enters the application dock on a mobile device, the mobile device may display multiple snapshots of different applications in the application dock. Certain embodiments may determine whether to use a currently existing snapshot based on how current the application data in the existing snapshot is compared to application data last retrieved when the application was running. By comparing the timestamps of application data from different sources, embodiments may present a most updated preview of application data to the user in the preview mode, without requiring the application to retrieve new data on-the-fly. Embodiments may reduce latency and save computing resources by not requiring the application to retrieve updated application data on-the-fly as the user enters the dock, while at the same time displaying a snapshot of the application that includes fairly updated application data. Certain embodiments may also facilitate the prompt display of a snapshot with fairly updated data (where key components of the application are still up-to-date), for example, by either using an existing snapshot or a snapshot generated using previously retrieved application data.

At block 805, process 800 can run an application that is accessible from a preview mode. Some embodiments can allow a user to view several application snapshots in a preview mode where the previews include up-to-date or recent application data, regardless of whether the application is currently running. The user can navigate among the various preview icons such as that shown in FIG. 6B and select an application icon corresponding to an application to cause the application to be launched. While the application may be accessible from the preview mode, the application may also be launched via many other ways, such as by tapping the application icon displayed on a home screen, etc. When the application is actively running, the mobile device can be receiving and storing multiple image layers for the application. In certain embodiments, the image layers are ordered based on an application layer hierarchy.

At block 810, process 800 can exit the application. The application can be associated with a layer hierarchy in some embodiments. In certain embodiments, the layer hierarchy may store information on how image layers of the application (also referred to as layer data) are stacked against each other while the application was running. In some embodiments, the layer hierarchy may include the configuration of the image layers right before the application is exited.

At block 815, process 800 can persist storage of the layer hierarchy in memory after exiting the application. Certain embodiments may continue to store the image layers of the application and the layer hierarchy in local memory on the mobile device after the application has been suspended (e.g., by the user exiting or closing out of the application). In some embodiments, the application may be suspended when it is no longer running in the foreground. While the application data is typically removed from memory after the application is exited, embodiments may continue to store the layer hierarchy after the application is no longer running on the mobile device. Further, some embodiments may store a timestamp along with the layer hierarchy when the application is exited.

At block 820, process 800 can receive an indication of a user entering the preview mode. In some embodiments, the indication of the user entering the preview mode can be received when the user selects a button on the mobile device or when the user selects a preview mode icon. Different embodiments may allow the user to enter the preview mode differently. The preview mode may display multiple application snapshots that have updated application data.

At block 825, process 800 can determine whether the timestamp of the layer hierarchy is newer than the timestamp of an existing snapshot. In some embodiments, a snapshot validator such as snapshot validator 720 in FIG. 7 can make this determination. In certain embodiments, the timestamp of the layer hierarchy indicates the time in which the application last exited. In some embodiments, the timestamp of an existing snapshot indicates the time in which the existing snapshot was last created or updated. Some embodiments may compare the timestamp of the layer hierarchy with the timestamp of the existing snapshot to determine which is newer.

At block 830, process 800 can display the existing snapshot upon determining that the timestamp of the layer hierarchy is not newer than the timestamp of the existing snapshot. In certain embodiments, a snapshot renderer such as snapshot renderer 725 in FIG. 7 can render the existing snapshot in the preview mode as the user browses through the preview mode. In some embodiments, the timestamp of the existing snapshot is newer when the existing snapshot was updated or generated at a time later than the last time the application was launched and running.

At block 835, process 800 can retrieve layer data upon determining that the timestamp of the layer hierarchy is newer than the timestamp of the existing snapshot. In some embodiments, the layer hierarchy and the layer data are stored in persistent memory when the application exits. Embodiments may determine the layer hierarchy and the layer data upon determining that the last time that the application was running is more recent than the last time the snapshot in the preview mode was updated.

At block 840, process 800 can create a new snapshot for the application from the layer data. Some embodiments may use the layer hierarchy to determine a configuration of the layer data and create a new snapshot using the layer hierarchy. A snapshot renderer such as snapshot renderer 725 in FIG. 7 can generate the new snapshot using the layer data.

At block 845, process 800 can display the new snapshot. Some embodiments may display the new snapshot in the preview mode as the user activates and browses the preview mode.

VIII. Example Mobile Device

Figure 9:
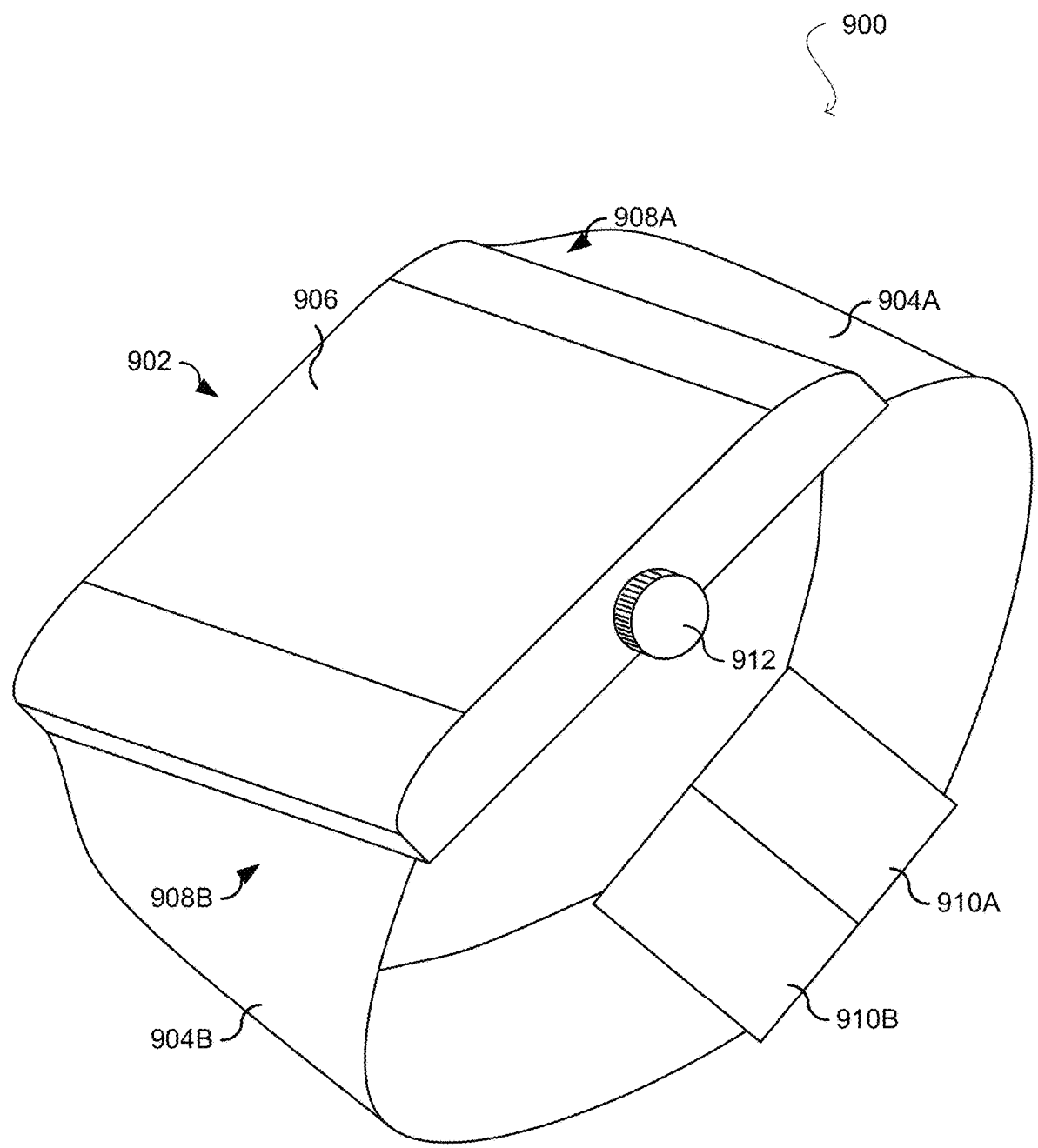
FIG. 9 shows a wearable device for displaying one or more previews of applications in a dock according to some embodiments.

Embodiments described herein may take the form of, be incorporated in, or operate with a suitable electronic device. One example of such a device is shown in FIG. 9 and takes the form of a wearable mechanism (e.g., the mobile device 105 of FIG. 1 or another type of smart device). Alternative embodiments of suitable electronic devices include a mobile phone, a tablet computing device, a portable media player, and so on. Still other suitable electronic devices may include laptop/notebook computers, personal digital assistants, touch screens, input-sensitive pads or surfaces, and so on.

FIG. 9 shows a wearable device 900 for displaying one or more previews of applications in a dock according to some embodiments. In this example, wearable device 900 is shown as a wristwatch-like device with a face portion 902 connected to straps 904A, 904B. In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Face portion 902 can include, e.g., a touchscreen display 906 that can be appropriately sized depending on where on a user's person wearable device 900 is intended to be worn. A user can view information presented by wearable device 900 on touchscreen display 906 and provide input to wearable device 900 by touching touchscreen display 906. In some embodiments, touchscreen display 906 can occupy most or all of the front surface of face portion 902.

Straps 904A, 904B can be provided to allow wearable device 900 to be removably worn by a user, e.g., around the user's wrist, and secured thereto. In some embodiments, straps 904A, 904B can be made of any flexible material (e.g., fabrics, flexible plastics, leather, chains or flexibly interleaved plates or links made of metal or other rigid materials) and can be connected to face portion 902, e.g., by hinges. Alternatively, straps 904A, 904B can be made of a rigid material, with one or more hinges positioned at the junction of face portion 902 and proximal ends 908A, 908B of straps 904A, 904B and/or elsewhere along the lengths of straps 904A, 904B to allow a user to put on and take off wearable device 900. Different portions of straps 904A, 904B can be made of different materials; for instance, flexible or expandable sections can alternate with rigid sections. In some embodiments, one or both of straps 904A, 904B can include removable sections, allowing wearable device 900 to be resized to accommodate a particular user's wrist size. In some embodiments, straps 904A, 904B can be portions of a continuous strap member that runs behind or through face portion 902. Face portion 902 can be detachable from straps 904A, 904B; permanently attached to straps 904A, 904B; or integrally formed with straps 904A, 904B.

The distal ends of straps 904A, 904B opposite face portion 902 can provide complementary clasp members 910A, 910B that can be engaged with each other to secure the distal ends of straps 904A, 904B to each other, forming a closed loop. In this manner, device 900 can be secured to a user's person, e.g., around the user's wrist; clasp members 910A, 910B can be subsequently disengaged to facilitate removal of device 900 from the user's person. The design of clasp members 910A, 910B can be varied; in various embodiments, clasp members 910A, 910B can include buckles, magnetic clasps, mechanical clasps, snap closures, etc. In some embodiments, one or both of clasp members 910A, 910B can be movable along at least a portion of the length of corresponding strap 904A, 904B, allowing wearable device 900 to be resized to accommodate a particular user's wrist size.

Straps 904A, 904B can be two distinct segments, or they can be formed as a continuous band of an elastic material (including, e.g., elastic fabrics, expandable metal links, or a combination of elastic and inelastic sections), allowing wearable device 900 to be put on and taken off by stretching a band formed straps 904A, 904B. In such embodiments, clasp members 910A, 910B can be omitted.

Straps 904A, 904B and/or clasp members 910A, 910B can include sensors that allow wearable device 900 to determine whether it is being worn at any given time. Wearable device 900 can operate differently depending on whether it is currently being worn or not. For example, wearable device 900 can inactivate various user interface and/or RF interface components when it is not being worn. In addition, in some embodiments, wearable device 900 can notify a companion device (e.g., a smartphone, a mobile device, a tablet device, a media player, a speaker, or other electronic devices) when a user puts on or takes off wearable device 900.

In various embodiments, wearable device 900 includes a rotary input such as a crown 912 (also referred to as digital crown throughout the specification). Crown 912 can be used to perform a variety of functions. In some embodiments, crown 912 provides rotation input for navigating content (e.g., zooming in and out of content, panning across content). In this example, crown 912 includes a plastic or metal crown body, preferably having conventional outer teeth. Typically, a pedestal made integral with the body of crown 912 is positioned and protrudes into face portion 902. Crown 912 may be fastened, either permanently or removably, to hardware associated with wearable device 900. Rotation of the crown (and/or a stem) may be sensed optically, electrically, magnetically, or mechanically. Further, in some embodiments the crown (and/or stem) may also move laterally, thereby providing a second type of input to the device.

Wearable device 900 may likewise include one or more buttons (not shown here). The button(s) may be depressed to provide yet another input to the device. In various embodiments, the button may be a dome switch, rocker switch, electrical contact, magnetic switch, and so on. In some embodiments the button may be waterproof or otherwise sealed against the environment.

It will be appreciated that wearable device 900 is illustrative and that variations and modifications are possible. For example, wearable device 900 can be implemented in any wearable article, including a watch, a bracelet, a necklace, a ring, a belt, a jacket, or the like. In some instances, wearable device 900 can be a clip-on device or pin-on device that has a clip or pin portion that attaches to the user's clothing. The interface portion (including, e.g., touchscreen display 906) can be attached to the clip or pin portion by a retractable cord, and a user can easily pull touchscreen display 906 into view for use without removing the clip or pin portion, then let go to return wearable device 900 to its resting location. Thus, a user can wear wearable device 900 in any convenient location.

Figure 10:
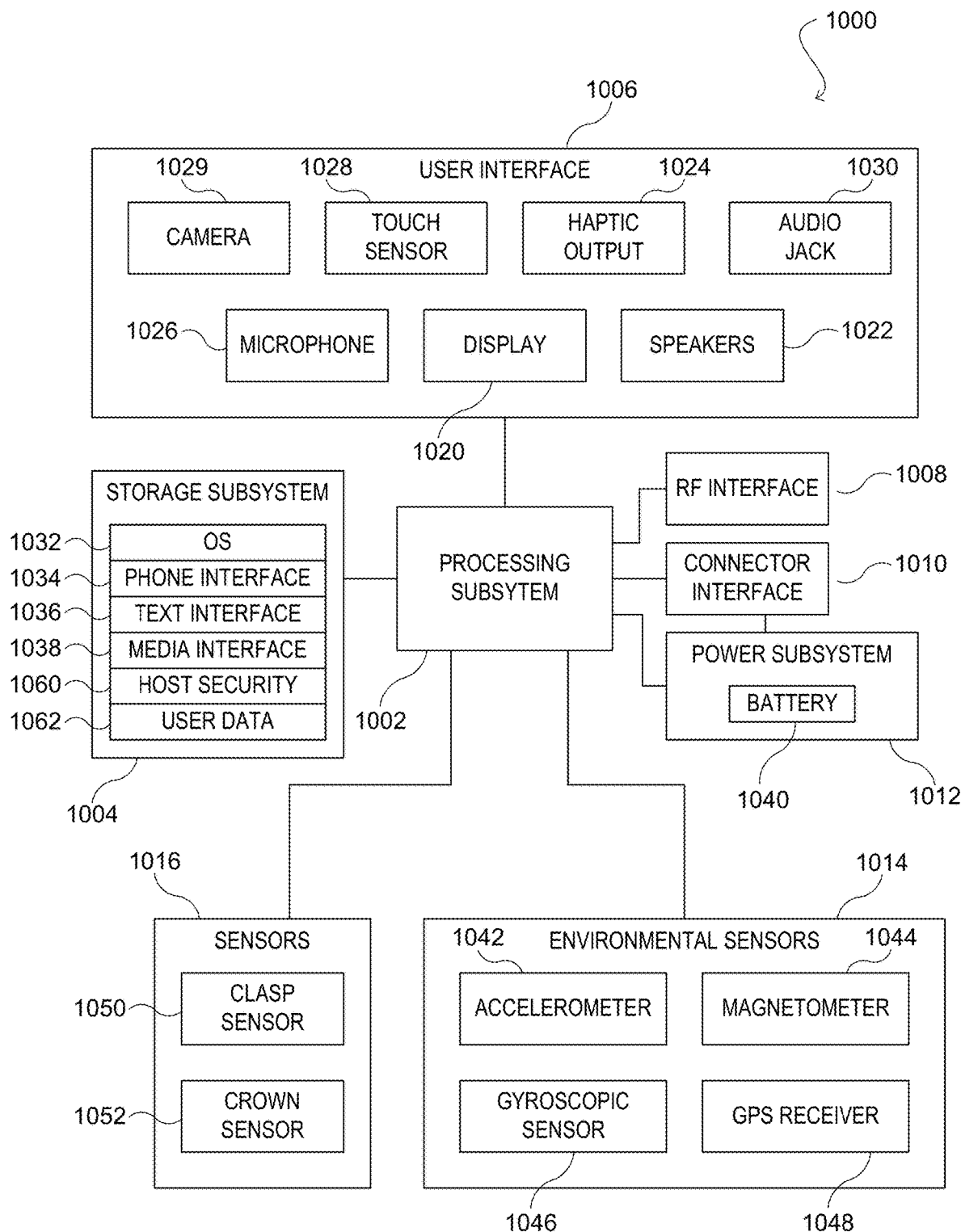
FIG. 10 is a simplified block diagram of the wearable device of FIG. 9 (e.g., implementing wearable device) according to one embodiment.

Wearable device 900 can be implemented using electronic components disposed within face portion 902, straps 904A, 904B, and/or clasp members 910A, 910B. FIG. 10 is a simplified block diagram of the wearable device of FIG. 9 (e.g., implementing wearable device 900) according to one embodiment. Wearable device 1000 can include processing subsystem 1002, storage subsystem 1004, user interface 1006, RF interface 1008, connector interface 1010, power subsystem 1012, environmental sensors 1014, and strap sensors 1016. Wearable device 1000 can also include other components (not explicitly shown).

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Storage subsystem 1004 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 1004 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 1004 can also store one or more application programs to be executed by processing subsystem 1002 (e.g., video game programs, personal information management programs, media playback programs, interface programs associated with particular host devices and/or host device functionalities, etc.).

User interface 1006 can include any combination of input and output devices. A user can operate input devices of user interface 1006 to invoke the functionality of wearable device 1000 and can view, hear, and/or otherwise experience output from wearable device 1000 via output devices of user interface 1006.

Examples of output devices include display 1020, speakers 1022, and haptic output generator 1024. Display 1020 can be implemented using compact display technologies, e.g., LCD (liquid crystal display), LED (light-emitting diode), OLED (organic light-emitting diode), or the like. In some embodiments, display 1020 can incorporate a flexible display element or curved-glass display element, allowing wearable device 1000 to conform to a desired shape. One or more speakers 1022 can be provided using small-form-factor speaker technologies, including any technology capable of converting electronic signals into audible sound waves. In some embodiments, speakers 1022 can be used to produce tones (e.g., beeping or ringing) and can but need not be capable of reproducing sounds such as speech or music with any particular degree of fidelity. Haptic output generator 1024 can be, e.g., a device that converts electronic signals into vibrations; in some embodiments, the vibrations can be strong enough to be felt by a user wearing wearable device 1000 but not so strong as to produce distinct sounds.

Wearable device 1000 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Examples of input devices include microphone 1026, touch sensor 1028, and camera 1029. Microphone 1026 can include any device that converts sound waves into electronic signals. In some embodiments, microphone 1026 can be sufficiently sensitive to provide a representation of specific words spoken by a user; in other embodiments, microphone 1026 can be usable to provide indications of general ambient sound levels without necessarily providing a high-quality electronic representation of specific sounds.

Touch sensor 1028 can include, e.g., a capacitive sensor array with the ability to localize contacts to a particular point or region on the surface of the sensor and in some instances, the ability to distinguish multiple simultaneous contacts. In some embodiments, touch sensor 1028 can be overlaid over display 1020 to provide a touchscreen interface, and processing subsystem 1002 can translate touch events (including taps and/or other gestures made with one or more contacts) into specific user inputs depending on what is currently displayed on display 1020. In some embodiments, touch sensor 1028 can also determine a location of a touch on the cover glass. A touch sensor may be incorporated into or on the display stack in order to determine a location of a touch. The touch sensor may be self-capacitive in certain embodiments, mutual-capacitive in others, or a combination thereof.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

Camera 1029 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 1004 and/or transmitted by wearable device 1000 to other devices for storage. Depending on implementation, the optical components can provide fixed focal distance or variable focal distance; in the latter case, autofocus can be provided. In some embodiments, camera 1029 can be disposed along an edge of face portion 902 of FIG. 9, e.g., the top edge, and oriented to allow a user to capture images of nearby objects in the environment such as a bar code or QR code. In other embodiments, camera 1029 can be disposed on the front surface of face portion 902 of FIG. 9, e.g., to capture images of the user. Zero, one, or more cameras can be provided, depending on implementation.

In some embodiments, user interface 1006 can provide output to and/or receive input from an auxiliary device such as a headset. For example, audio jack 1030 can connect via an audio cable (e.g., a standard 2.5-mm or 3.5-mm audio cable) to an auxiliary device. Audio jack 1030 can include input and/or output paths. Accordingly, audio jack 1030 can provide audio to the auxiliary device and/or receive audio from the auxiliary device. In some embodiments, a wireless connection interface can be used to communicate with an auxiliary device.

Processing subsystem 1002 can be implemented as any electronic device capable of processing, receiving, or transmitting data or instructions. Processing subsystem 1002 can include one or more integrated circuits. For example, processing subsystem 1002 may include one or more of: one or more single-core or multi-core microprocessors or microcontrollers, a central processing unit (CPU), an application-specific integrated circuit (ASIC), a digital signal processor (DSP), or additional or combinations of such devices. In operation, processing subsystem 1002 can control the operation of wearable device 1000. In various embodiments, processing subsystem 1002 can execute a variety of programs in response to program code and can maintain multiple concurrently executing programs or processes. At any given time, some or all of the program code to be executed can be resident in processing subsystem 1002 and/or in storage media such as storage subsystem 1004.

Through suitable programming, processing subsystem 1002 can provide various functionality for wearable device 1000. For example, in some embodiments, processing subsystem 1002 can execute an operating system (OS) 1032 and various applications for interfacing with a host device, such as a phone-interface application 1034, a text-interface application 1036, and/or a media interface application 1038. In some embodiments, some or all of these application programs can interact with a host device, e.g., by generating messages to be sent to the host device and/or by receiving and interpreting messages from the host device. In some embodiments, some or all of the application programs can operate locally to wearable device 1000. For example, if wearable device 1000 has a local media library stored in storage subsystem 1004, media interface application 1038 can provide a user interface to select and play locally stored media items. Examples of interface applications are described below.

In some embodiments, processing subsystem 1002 can also execute a host security process 1060 that provides support for establishing and maintaining a verified communication session with a host device. A verified communication session can provide an enhanced level of security, and various operations of wearable device 1000 and/or a host device can be made conditional on whether a verified communication session between the devices is in progress. For instance, host security process 1060 can facilitate unlocking a host device when wearable device 1000 is present, depending on whether a verified session is in progress. User data 1062 can include any information specific to a user, such as identification information, user-specified settings and preferences, customized information (e.g., contacts, predefined text messages), and any other user-related data or content. In some embodiments, executing applications and processes can access user data 1062 to facilitate operations.

RF (radio frequency) interface 1008 can allow wearable device 1000 to communicate wirelessly with various host devices. RF interface 1008 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 1008 can be implemented using a combination of hardware (e.g., driver circuits, antennas, modulators/demodulators, encoders/decoders, and other analog and/or digital signal processing circuits) and software components. In some embodiments, RF interface 1008 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 1008. Wearable device 1000 may wirelessly communicate with a sales terminal nearby, thus permitting a user to quickly and efficiently conduct a transaction such as selling, buying, or returning a good. Wearable device 1000 may use NFC technology to perform these and other functions.

Connector interface 1010 can allow wearable device 1000 to communicate with various host devices via a wired communication path, e.g., using Universal Serial Bus (USB), universal asynchronous receiver/transmitter (UART), or other protocols for wired data communication. In some embodiments, connector interface 1010 can provide a power port, allowing wearable device 1000 to receive power, e.g., to charge an internal battery. For example, connector interface 1010 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from a host device in analog and/or digital formats.

In some embodiments, connector interface 1010 and/or RF interface 1008 can be used to support synchronization operations in which data is transferred from a host device to wearable device 1000 (or vice versa). For example, as described below, a user can customize certain information for wearable device 1000 (e.g., a "favorite" contacts list and/or specific predefined text messages that can be sent). While user interface 1006 can support data-entry operations, a user may find it more convenient to define customized information on a separate device (e.g., a tablet or smartphone) that has a larger interface (e.g., including a real or virtual alphanumeric keyboard), then transfer the customized information to wearable device 1000 via a synchronization operation. Synchronization operations can also be used to load and/or update other types of data in storage subsystem 1004, such as media items, application programs, and/or operating system programs. Synchronization operations can be performed in response to an explicit user request and/or automatically, e.g., when wearable device 1000 resumes communication with a particular host device or in response to either device receiving an update to its copy of synchronized information.

Environmental sensors 1014 can include various electronic, mechanical, electromechanical, optical, or other devices that provide information related to external conditions around wearable device 1000. Sensors 1014 in some embodiments can provide digital signals to processing subsystem 1002, e.g., on a streaming basis or in response to polling by processing subsystem 1002 as desired. Any type and combination of environmental sensors can be used; shown by way of example are accelerometer 1042, a magnetometer 1044, a gyroscope sensor 1046, and a GPS receiver 1048.

Some environmental sensors can provide information about the location and/or motion of wearable device 1000. For example, accelerometer 1042 can sense acceleration (relative to freefall) along one or more axes, e.g., using piezoelectric or other components in conjunction with associated electronics to produce a signal. Magnetometer 1044 can sense an ambient magnetic field (e.g., Earth's magnetic field) and generate a corresponding electrical signal, which can be interpreted as a compass direction. Gyroscope sensor 1046 can sense rotational motion in one or more directions, e.g., using one or more MEMS (micro-electro-mechanical systems) gyroscopes and related control and sensing circuitry. Global Positioning System (GPS) receiver 1048 can determine location based on signals received from GPS satellites.

Other sensors can also be included in addition to or instead of these examples. For example, a sound sensor can incorporate microphone 1026 together with associated circuitry and/or program code to determine, e.g., a decibel level of ambient sound. Temperature sensors, proximity sensors, ambient light sensors, or the like can also be included. The ambient light sensor may permit the device to sense a brightness of its environment and adjust certain operational parameters accordingly. For example, wearable device 1000 may modify a brightness of a display in response to the sensed ambient light. As another example, wearable device 1000 may turn the display off if little or no light is sensed for a period of time.

Sensors 1016 can include various electronic, mechanical, electromechanical, optical, or other devices that provide information to wearable device 1000. For instance, clasp sensor 1050 can be at least partially disposed within either or both of clasp members 910A, 910B of FIG. 9 and can detect when clasp members 910A, 910B are engaged with each other or disengaged from each other. For example, engaging clasp members 910A, 910B to each other can complete an electrical circuit, allowing current to flow through clasp sensor 1050; disengaging clasp members 910A, 910B from each other can break the circuit. As another example, one or more crown sensors 1052 can be disposed to detect input from crown 912 of FIG. 9. Crown sensors 1052 can also include motion sensors, accelerometers, pressure sensors (e.g., piezoelectric devices), or the like.

Any other type of sensor can be used in addition to or instead of strap sensors 1016 and crown sensors 1052. For instance, physiological or biometric sensors, such as pulse sensors, ECG sensors, or the like can be provided. In some embodiments, physiological sensors can monitor a user's physiological signals and provide health-related information based on those signals. In certain embodiments, physiological or biometric sensors can be used in verifying the identity of the wearer of wearable device 1000.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. In some embodiments, the device may also measure blood pressure, ultraviolet exposure, etc. Depending on the sensors incorporated into or associated with the electronic device, a variety of user characteristics may be measured and/or estimated, thereby permitting different health information to be provided to a user. In some examples, the sensed biometric information may be used by the alert manager, in part, for managing the electronic content and/or the incoming alerts.

Similarly, wearable device 1000 may include a force sensor (not shown here) to determine an amount of force applied to the cover glass. The force sensor may be a capacitive sensor in some embodiments and a strain sensor in other embodiments. In either embodiment, the force sensor is generally transparent and made from transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

Power subsystem 1012 can provide power and power management capabilities for wearable device 1000. For example, power subsystem 1012 can include a battery 1040 (e.g., a rechargeable battery) and associated circuitry to distribute power from battery 1040 to other components of wearable device 1000 that require electrical power. In some embodiments, power subsystem 1012 can also include circuitry operable to charge battery 1040, e.g., when connector interface 1010 is connected to a power source. In some embodiments, power subsystem 1012 can include a "wireless" charger, such as an inductive charger, to charge battery 1040 without relying on connector interface 1010. An inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes. In some embodiments, power subsystem 1012 can also include other power sources, such as a solar cell, in addition to or instead of battery 1040.

In some embodiments, power subsystem 1012 can control power distribution to components within wearable device 1000 to manage power consumption efficiently. For example, power subsystem 1012 can automatically place wearable device 1000 into a "hibernation" state when strap sensors 1016 indicate that wearable device 1000 is not being worn. The hibernation state can be designed to reduce power consumption; accordingly, user interface 1006 (or components thereof), RF interface 1008, connector interface 1010, and/or environmental sensors 1014 can be powered down (e.g., to a low-power state or turned off entirely), while strap sensors 1016 are powered up (either continuously or at intervals) to detect when a user puts on wearable device 1000. As another example, in some embodiments, while wearable device 1000 is being worn, power subsystem 1012 can turn display 1020 and/or other components on or off depending on motion and/or orientation of wearable device 1000 detected by environmental sensors 1014. For instance, if wearable device 1000 is designed to be worn on a user's wrist, power subsystem 1012 can detect raising and rolling of a user's wrist, as is typically associated with looking at a wristwatch, based on information provided by accelerometer 1042. In response to this detected motion, power subsystem 1012 can automatically turn display 1020 and/or touch sensor 1028 on; similarly, power subsystem 1012 can automatically turn display 1020 and/or touch sensor 1028 off in response to detecting that user's wrist has returned to a neutral position (e.g., hanging down).

Power subsystem 1012 can also provide other power management capabilities, such as regulating power consumption of other components of wearable device 1000 based on the source and amount of available power, monitoring stored power in battery 1040, generating user alerts if the stored power drops below a minimum level, and so on.

In some embodiments, control functions of power subsystem 1012 can be implemented using programmable or controllable circuits operating in response to control signals generated by processing subsystem 1002 in response to program code executing thereon, or as a separate microprocessor or microcontroller.

It will be appreciated that wearable device 1000 is illustrative and that variations and modifications are possible.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle °, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile media, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising performing, by one or more processors of a mobile device:

identifying a plurality of applications for which snapshots are to be displayed in a preview mode that is triggered by user input, wherein the preview mode provides a browsable display of the snapshots of the plurality of applications, where each of the snapshots provides at least a portion of data that would be displayed by a corresponding application when executed in a foreground of the mobile device, the plurality of applications including a first application that provides a first snapshot;

receiving, at a scheduler from the first application, a first request for updating first data in the first snapshot, the first request including first time information, wherein the scheduler determines that the first time information for the first application indicates when data for the first application becomes outdated;

determining, by the scheduler, a first time period for granting permission to the first application for updating the first data based on the first time information, wherein the determining the first time period for granting permission to the first application for updating the first data is further based on an allotted processing power of the mobile device corresponding to an allotted update frequency for the first application;

providing, by the scheduler to the first application, a first message indicating that the permission has been granted to update the first data in accordance with the first time period;

receiving, from the first application, a second request to update the first data in accordance with the permission;

obtaining first updated data from a second device in response to the second request; and generating an updated first snapshot using the first updated data for display.

2. The method of claim 1 wherein the second request is received at a data service daemon, the method further comprising:

providing, by the scheduler to the data service daemon, a second message indicating the permission for the first application to request the first updated data for the first time period.

3. The method of claim 1 further comprising:

receiving the updated first snapshot from the first application; and displaying the updated first snapshot in the preview mode.

4. The method of claim 1 further comprising:

receiving, at the scheduler from a second application, a third request for updating second data in a second snapshot, the third request including second time information;

determining a second time period for granting permission to the second application for updating the second data based on the second time information, wherein the second time period is different from the first time period;

providing the second application a second message indicating that permission has been granted to update the second data in accordance with the second time period;

receiving, from the second application, a fourth request to update the second data in accordance with the permission;

obtaining second updated data from the second device in response to the fourth request; and generating an updated second snapshot using the second updated data for display.

5. The method of claim 1 wherein a second snapshot corresponds to a second application in the plurality of applications, and wherein a portion of the second snapshot is displayed adjacent to the first snapshot.

6. The method of claim 1 wherein the first application is not actively running.

7. The method of claim 1 further comprising:

receiving a selection of the first snapshot; and launching the first application corresponding to the first snapshot.

8. A mobile device comprising:

one or more processors; and memory coupled to the one or more processors, wherein the memory is encoded with a set of instructions which when executed causes the one or more processors to perform:

identifying a plurality of applications for which snapshots are to be displayed in a preview mode that is triggered by user input, wherein the preview mode provides a browsable display of the snapshots of the plurality of applications, where each of the snapshots provides at least a portion of data that would be displayed by a corresponding application when executed in a foreground of the mobile device, the plurality of applications including a first application that provides a first snapshot;

receiving, at a scheduler, a first request for updating first data in the first snapshot, the first request including first time information, wherein the scheduler determines that the first time information for the first application indicates when data for the first application becomes outdated;

determining, by the scheduler, a first time period for granting permission to the first application for updating the first data based on the first time information, wherein the determining the first time period for granting permission to the first application for updating the first data is further based on an allotted processing power of the mobile device corresponding to an allotted update frequency for the first application;

providing a first message indicating that the permission has been granted to update the first data in accordance with the first time period;

receiving a second request to update the first data in accordance with the permission;

obtaining first updated data from a second device in response to the second request; and generating an updated first snapshot using the first updated data for display.

9. The mobile device of claim 8 wherein the second request is received at a data service daemon, the mobile device further comprising:

providing a second message indicating the permission for the first application to request the first updated data for the first time period.

10. The mobile device of claim 8 wherein the one or more processors are further caused to perform:

receiving the updated first snapshot from the first application; and displaying the updated first snapshot in the preview mode.

11. The mobile device of claim 8 wherein the one or more processors are further caused to perform:
- receiving, from a second application, a third request for updating second data in a second snapshot, the third request including second time information;
- determining a second time period for granting permission to the second application for updating the second data based on the second time information, wherein the second time period is different from the first time period;
- providing the second application a second message indicating that permission has been granted to update the second data in accordance with the second time period;
- receiving, from the second application, a fourth request to update the second data in accordance with the permission;
- obtaining second updated data from the second device in response to the fourth request; and
- generating an updated second snapshot using the second updated data for display.

12. The mobile device of claim 8 wherein a second snapshot corresponds to a second application in the plurality of applications, and wherein a portion of the second snapshot is displayed adjacent to the first snapshot.

13. The mobile device of claim 8 wherein the first application is not actively running.

14. The mobile device of claim 8 wherein the one or more processors are further caused to perform:
- receiving a selection of the first snapshot; and
- launching the first application corresponding to the first snapshot.

* * * * *